United States Patent
Zaluska et al.

(10) Patent No.: US 7,811,957 B2
(45) Date of Patent: Oct. 12, 2010

(54) TYPE OF CATALYTIC MATERIALS BASED ON ACTIVE METAL-HYDROGEN-ELECTRONEGATIVE ELEMENT COMPLEXES INVOLVING HYDROGEN TRANSFER

(76) Inventors: Alicja Zaluska, 3510 Paul-Emile-Côtè, Montreal, Quebec (CA) H4E 1Z6; Leszek Zaluski, 3510 Paul-Emile-Côtà, Montreal, Quebec (CA) H4E 1Z6

( * ) Notice: Subject to any disclaimer, the term of this patent is extended or adjusted under 35 U.S.C. 154(b) by 1100 days.

(21) Appl. No.: 10/746,742

(22) Filed: Dec. 24, 2003

(65) Prior Publication Data

US 2005/0002856 A1    Jan. 6, 2005

Related U.S. Application Data

(63) Continuation-in-part of application No. PCT/CA03/00960, filed on Jun. 25, 2003.

(30) Foreign Application Priority Data

Jun. 25, 2002    (CA) .................................... 2389939

(51) Int. Cl.
  *B01J 31/00*    (2006.01)
(52) U.S. Cl. ............... 502/118; 423/648.1; 423/658.2; 502/102; 502/119; 502/120; 502/124; 502/125
(58) Field of Classification Search ............. 423/648.1, 423/658.2; 502/102
  See application file for complete search history.

(56) References Cited

U.S. PATENT DOCUMENTS

| | | | | |
|---|---|---|---|---|
| 4,368,143 A | * | 1/1983 | de Pous | 75/252 |
| 4,507,263 A | * | 3/1985 | Ron | 419/48 |
| 4,555,395 A | * | 11/1985 | Sirovich et al. | 423/644 |
| 5,833,934 A | * | 11/1998 | Adlhart | 422/239 |
| 5,962,165 A | | 10/1999 | Tsuruta et al. | |
| 6,245,165 B1 | * | 6/2001 | Arvidsson et al. | 148/426 |
| 6,251,349 B1 | | 6/2001 | Zaluska et al. | |

(Continued)

FOREIGN PATENT DOCUMENTS

EP    0892451 A2    1/1999

(Continued)

OTHER PUBLICATIONS

Oelerich W. et al.; "Metal oxides as catalysts for improved hydrogen sorption in nanocrystalline Mg-based materials"; Journal of Alloys and Compounds, Elsevier Sequoia, Lausanne, CH, vol. 315. 2001, pp. 237-242.

(Continued)

*Primary Examiner*—Stanley Silverman
*Assistant Examiner*—Paul A Wartalowicz
(74) *Attorney, Agent, or Firm*—Haynes and Boone, LLP

(57) ABSTRACT

Compositions are described for catalyzing or facilitating hydrogen transfer kinetics in various kinds of chemical reactions that depend on the efficiency of hydrogen relocation or exchange. One such composition has the formula M-H-E, where M is a metal, metalloid, alloy of a metal, alloy of a metalloid, compound of a metal or compound of a metalloid, H is hydrogen and E is an electronegative element. Another such composition is a hydrogen storage composition that includes the catalytic composition having the formula M-H-E and a hydride or a material capable of absorbing hydrogen to form a hydride.

28 Claims, 29 Drawing Sheets

U.S. PATENT DOCUMENTS

| | | | |
|---|---|---|---|
| 6,268,084 B1 | 7/2001 | Hayashida et al. | |
| 6,284,066 B1 * | 9/2001 | Shinya et al. | 148/513 |
| 6,332,907 B1 * | 12/2001 | Brungs | 75/255 |
| 6,342,318 B1 | 1/2002 | Fujitani et al. | |
| 6,387,152 B1 * | 5/2002 | Klassen et al. | 75/352 |
| 6,528,441 B1 * | 3/2003 | Heung et al. | 501/12 |
| 6,572,836 B1 * | 6/2003 | Schulz et al. | 423/648.1 |
| 6,652,619 B2 * | 11/2003 | Omori et al. | 75/255 |
| 2001/0000889 A1 * | 5/2001 | Yadav et al. | 204/242 |
| 2002/0166286 A1 * | 11/2002 | McClaine et al. | 48/197 R |
| 2004/0022008 A1 * | 2/2004 | Omori et al. | 361/302 |

FOREIGN PATENT DOCUMENTS

| | | |
|---|---|---|
| JP | 54011095 | 1/1979 |
| JP | 11264041 | 9/1999 |
| JP | 2000080429 | 3/2000 |
| JP | 2001303160 | 10/2001 |
| JP | 2002097535 | 4/2002 |
| WO | WO 00/07930 | 2/2000 |

OTHER PUBLICATIONS

Oelerich W. et al.; "Comparison of the catalytic effects of V, V2O5, VN, and VC on the hydrogen sorption of nanocrystalline Mg"; Journal of Alloys and Compounds, Elsevier Sequoia, Lausanne, CH, vol. 322, No. 1-2, Jun. 28, 2001, pp. L5-L9.

A. Zaluska, L. Zaluski; New Catalytic Complexes for Metal Hydride Systems; Journal of Alloys and Compounds 404-406; Jul. 14, 2005; pp. 706-711.

* cited by examiner (a) (b)

TYPE OF CATALYTIC MATERIALS BASED ON ACTIVE METAL-HYDROGEN-ELECTRONEGATIVE ELEMENT COMPLEXES INVOLVING HYDROGEN TRANSFER

RELATED APPLICATIONS

This is a continuation-in-part of PCT/CA03/00960, filed Jun. 25, 2003.

FIELD OF THE INVENTION

The invention relates to new catalytic materials of specific composition and molecular structure, which are able to catalyze and improve efficiency of chemical reactions involving hydrogen transfer.

BACKGROUND OF THE INVENTION

Many chemical reactions in both inorganic and organic chemistry involve relocation of hydrogen atoms, ions (protons), or molecules, which need to be transferred from one chemical molecule to another molecule, or exchanged with other atoms, ions or radicals in the reaction route. Amongst many such reactions, the most common types are: hydrogenation and dehydrogenation, reduction/oxidation, various types of reactions involving organic compounds, electrochemical reactions, and reactions in all types of fuel cells. All these reactions may exhibit a wide spectrum of various types of chemical bonding and various underlying atomic-scale mechanisms, as well as different nature of atomic interactions. In all of them, there is however one universal feature that controls the rate and efficiency of these reactions, i.e. the effectiveness of hydrogen relocation. In the course of these reactions, the events of hydrogen transfer or exchange occur repeatedly and improving the efficiency of hydrogen relocation is the main challenge for many chemical technologies. In the most effective way, the reactions with hydrogen transfer can be facilitated by catalysis. The ultimate role of catalysts is to promote atomic-scale processes of hydrogen transfer or exchange (by lowering the activation energy connected with hydrogen relocation). In most cases, in the absence of the catalysts the chemical reaction would either not occur at all, or would take place with much lower efficiencies, rates, or at higher temperatures. The general field of catalysis (which became one of the critical factors for the chemical technologies) is at present relatively wide and well developed, with a large number of various catalytic materials being investigated and used.

In general, there are two main categories of catalysts: heterogeneous and homogeneous. Homogeneous catalysts are in the same phase as the basic reactants, and heterogeneous catalysts are in the different phase, for example: solid catalysts in the gaseous reactions. The development and current understanding of catalysis allows us to distinguish two essential catalytic mechanisms, i.e. acidic catalysis and basic catalysis, where reactants act either as bases toward catalysts which in turn act as acids, or as acids toward basic catalysts. Amongst many types of basic catalysts, the following are the most common: (H. Hattori "Heterogeneous Basic Catalysts", Chem. Rev. 1995, 95, 537)

Single component metal oxides (e.g. alkaline earth oxides)
Zeolites
Supported alkali metal ions (e.g. alkali metals on alumina)
Clay minerals
Non-oxide catalysts (e.g. KF supported on alumina)

For acidic catalysis, the following catalytic materials are being commonly used (A. Corma "Inorganic Solid Acids and Their Use in Acid-Catalyzed Hydrocarbon reactions", Chem. Rev. 1995, 95, 559):

Solid acid catalysts (e.g. amorphous silica-alumina and aluminum phosphate)
Zeolites and zeotypes
Heteropoly acids
Sulfated metal oxides.

The simplest catalysts are single-phase materials, such as metals, oxides, sulfides, carbides, borides and nitrides. Metal particles are among the most important catalysts, being used on a large scale for refining petroleum, conversion of automobile exhaust, hydrogenation of carbon monoxide, hydrogenation of fats and many other processes. Multiphase catalysts usually consist of an active phase (e.g. metal particles or clusters) dispersed on a carrier (support). It is generally assumed that metal particles act most probably as active centers for the hydrogen dissociation, but the role of the support is so far still not fully understood. In practice the metal is often expensive (for example Pt) and may constitute only about 1 wt. % of the catalytic material, being applied in a finely dispersed form as particles on a high-area porous metal oxide support (B. C. Gates "Supported Metal Clusters: Synthesis, Structure, and Catalysis", Chem. Rev. 1995, 95, 511). Supported metal clusters are synthesized through organometallic chemistry on surfaces, gas-phase cluster chemistry and special preparation of zeolite cages. The preparation methods commonly use techniques from preparative chemistry, such as precipitation, hydrolysis, and thermal decomposition. These processes involve mixing of solutions, blending of solids, filtration, drying, calcinations, granulation, extrusion (J. E. Schwarz et al. "Methods of Preparation of Catalytic Materials" Chem. Rev. 1995, 95 477).

Although, generally, catalysis is one of the most important fields of chemical technology, it is still far from being accomplished. Most catalysts are difficult to fabricate and the production process involves a sequence of several, complex steps (as mentioned above), many of which are still not completely understood (J. E. Schwarz et al. "Methods of Preparation of Catalytic Materials" Chem. Rev. 1995, 95 477). As a result, subtle changes in the preparative details may result in dramatic alteration in the properties of the final catalysts, which may thus become ineffective. Especially, the manner in which the active component of the catalyst is introduced onto a support, as well as the nature of the interaction between the active element and the carrier, could be of critical importance. Another crucial challenge in the preparation of catalysts is the ability to prepare these materials with sufficiently high surface area. Also, most of the multicomponent metal oxides require high-temperature treatment (exceeding 1000° C., as for alumina-based oxides), which is a significant technical drawback.

Another problem is that catalytic materials usually require "activation" i.e. some special treatment, before they could become active as catalysts, for example high-temperature annealing in vacuum or hydrogen atmosphere. Even then, however, in certain cases, the effect of annealing in hydrogen can indeed improve the catalyst's activity, but for other catalytic materials, the same treatment can actually have an adversary effect. Although the experimental data suggest that different catalytic supports lead to different effects of hydrogen treatment, these problems are still unresolved (B. C. Gates "Supported Metal Clusters: Synthesis, Structure, and Catalysis", Chem. Rev. 1995, 95, 511). Moreover, most catalysts become rapidly deactivated when exposed to air. They should be therefore handled under protective atmosphere, and pretreated at high temperatures after exposures to air in order to regain their catalytic properties.

All the above disadvantages of conventional catalytic materials cause continuous efforts to develop new, inexpensive materials with catalytic properties suitable for reactions involving hydrogen transfer, and to develop novel methods of their preparation.

The invention presents a practical and cost-efficient solution to this problem, by introducing a new type of catalytic materials, their manufacture and use as catalysts in chemical reactions.

SUMMARY OF THE INVENTION

In one broad aspect, the present invention provides a composition of matter prepared in accordance with a method comprising the steps of:
  (a) combining (i) a metalliferous material selected from the group consisting of: (A) a metal or a metalloid, or an alloy thereof, or a compound thereof, or (B) an homogeneous or inhomogeneous combination of at least two of a metal or a metalloid, an alloy thereof, or a compound thereof, with a (ii) source of hydrogen, to form a first intermediate;
  (b) milling the first intermediate to effect reaction between the metalliferous material and the hydrogen to form a second intermediate;
  (c) combining the second intermediate with a source of an electronegative element, to form a third intermediate; and
  (a) milling the third intermediate to effect reaction between the second intermediate and the electronegative element.

In yet another broad aspect, the present invention provides a composition of matter prepared in accordance with a method comprising:
  (a) combining (i) a metalliferous material selected from the group consisting of a hydride of any of (A) a metal or a metalloid, or an alloy thereof, or a compound thereof, or (B) an homogeneous or inhomogeneous combination of at least two of a metal or a metalloid, or an alloy thereof, or a compound thereof, with (ii) a source of an electronegative element, to form a first intermediate; and
  milling the first intermediate to effect reaction between the metalliferous material and the electronegative element.

In yet another broad aspect, the present invention provides a composition of matter prepared in accordance with a method (a) effecting a reaction between (i) a metalliferous material selected from the group consisting of: (A) a metal or a metalloid, or an alloy thereof, or a compound thereof, or (B) an homogeneous or an inhomogeneous combination of at least two of a metal or a metalloid, or an alloy thereof, or a compound thereof, and (ii) hydrogen, by a first milling, to form an intermediate product; and
  (b) effecting a reaction between the intermediate product and an electronegative element, by a second milling.

In another aspect, the present invention provides for a composition of matter prepared in accordance with a method comprising:
  effecting reaction between (i) a metalliferous material selected from the group consisting of an hydride of any of: (A) a metal or a metalloid, or an alloy thereof, or a compound thereof, or (B) an homogeneous or an inhomogeneous combination of at least two of a metal or a metalloid, or an alloy thereof, or a compound thereof, and (ii) an electronegative element, by milling.

In yet another aspect, the present invention provides a composition of matter prepared in accordance with a method comprising:
  (a) combining (i) a metalliferous material selected from the group consisting of: (A) a metal or a metalloid, or an alloy thereof, or a compound thereof, or an homogeneous or an inhomogeneous combination of at least two of a metal or a metalloid, or an alloy thereof, or a compound thereof, or (B) a hydride of any of: a metal or a metalloid, or alloy thereof, or a compound thereof, or an homogeneous or an inhomogeneous combination of a metal or a metalloid, or an alloy thereof, or a compound thereof, with ii) a liquid consisting essentially of any of: water, at least one alcohol, or a mixture of water and at least one alcohol, to form a first intermediate; and
  milling the first intermediate.

In one aspect, each of the milling steps is conducted in a substantially inert gaseous environment.

In another aspect, where an oxidative environment is preferably avoided in the milling step, the milling step is carried out in a gaseous environment having an insufficient concentration of an oxidizing agent to effect deleterious oxidation of the metal or metalloid component, or the alloy thereof, or the homogeneous or inhomogeneous combination of at least two of the metal or metalloid.

In yet another aspect, where a reducing environment is preferably avoided in the milling step, the milling step is carried out in a gaseous environment having an insufficient concentration of a reducing agent to effect deleterious reduction of the intermediate product.

In another aspect, the metal or metalloid is selected from the group consisting of Li, Na, K, Be, Mg, Ca, Y, Sc, Ti, Zr, Hf, V, Nb, Ta, Pt, Pd, Ru, Rh, Ge, Ga, In, La, Ce, Pr, Nd, Dy, Al, Si, B, Cr, Mo, W, Mn, Fe, Co, Ir, Ni, Cu, Ag, Au, Zn, Sn, Pb, Sb, and Bi.

In a further aspect, the electronegative element is selected from the group consisting of O, F, N, Cl, S, P, C, Te, and I.

In yet a further aspect, the compositions have a particulate form consisting of a plurality of particles, and having a particle size of less than 100 microns. In even a further aspect, 80% of the particles have a particle size of less than 50 microns, and the grains present in the particles are characterized by a size less than 100 nm.

In another aspect, the composition has an X-ray diffraction pattern that exhibits a characteristic Bragg's reflection of a co-ordination of (i) metal or metalloid and (ii) hydrogen.

In yet another aspect, the milling imparts an impact energy sufficient to effect the formation of the new atomic co-ordinations. In this respect, the milling can be carried out in a high energy ball mill.

Each of the above enumerated compositions of matter can function as hydrogen transfer facilitators. In this respect, each of the above-enumerated hydrogen transfer facilitator compositions can combine with a metalliferous material selected from the group consisting of: (A) a metal or a metalloid, or an alloy thereof, or a compound thereof, or an homogeneous or inhomogeneous combination of at least two of a metal or a metalloid, an alloy thereof, or a compound thereof, or (B) a hydride of any of: a metal or a metalloid, or an alloy thereof, or a compound thereof, or an homogeneous or inhomogeneous combination of at least two of a metal or a metalloid, or an alloy thereof, or a compound thereof, such combining effecting sufficient contact between the hydrogen transfer facilitator and the second metalliferous material so that the hydrogen transfer facilitator is configured to effect absorption or desorption of hydrogen by the metalliferous material.

In one aspect, the hydrogen transfer facilitator is mechanically alloyed to the metalliferous material. Such mechanical alloying can be effected by milling.

By functioning as a hydrogen transfer facilitator, the above-described compositions can effect a process of hydrogenating and dehydrogenating a hydrogen storage composition comprising the steps of:
(a) effecting absorption of hydrogen by the hydrogen storage composition; and
(b) effecting desorption of the absorbed hydrogen from the hydrogen storage composition; wherein steps (a) and (b) are carried out in any order.

In another broad aspect, the present invention provides a hydrogen storage composition comprising:
a metalliferous material selected from the group consisting of: (A) a metal or a metalloid, or an alloy thereof, or a compound thereof, or an homogeneous or inhomogeneous combination of at least two of a metal or a metalloid, or an alloy thereof, or a compound thereof, or (B) a hydride of any of: a metal or a metalloid, or an alloy thereof, or a compound thereof, or an homogeneous or inhomogeneous combination of at least two of a metal or a metalloid, or an alloy thereof, or a compound thereof; and
an hydrogen transfer facilitator having an atomic co-ordination characterized by one of the following structural formula:

(M+M1)-H-E     (a)

or (M)-H-E     (b)

wherein the hydrogen transfer facilitator is disposed in sufficient contact with the metalliferous material so that the hydrogen transfer facilitator is configured to effect absorption or desorption of hydrogen by the metalliferous material.

The hydrogen transfer facilitator can also have other atomic co-ordinations, including:

M-H-E; or     (1)

M-H—H.     (2)

An alkali-metal-based storage composition can also be prepared using any of the hydrogen transfer facilitators of the present invention. In this respect, such a hydrogen storage composition can be prepared using a method comprising the steps of:
combining (i) a first metalliferous material selected from the group consisting of: an alkali metal hydride, or an alloy thereof, (ii) a second metalliferous material selected from the group consisting of aluminum, or alloy thereof, or a compound thereof, and (iii) a hydrogen transfer facilitator, to form a first intermediate;
milling the first intermediate to form a second intermediate; and
contacting the second intermediate with gaseous hydrogen.

Additionally, any of the hydrogen transfer facilitators of the present invention can be used to enhance the kinetics of hydrolysis of a hydrogen-containing metalliferous material, to thereby effect generation of hydrogen.

Any of the hydrogen storage compositions of the present invention can also be used to effect formation of an aluminum foam by combining aluminum foam with the hydrogen storage composition.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION

Figure 1:
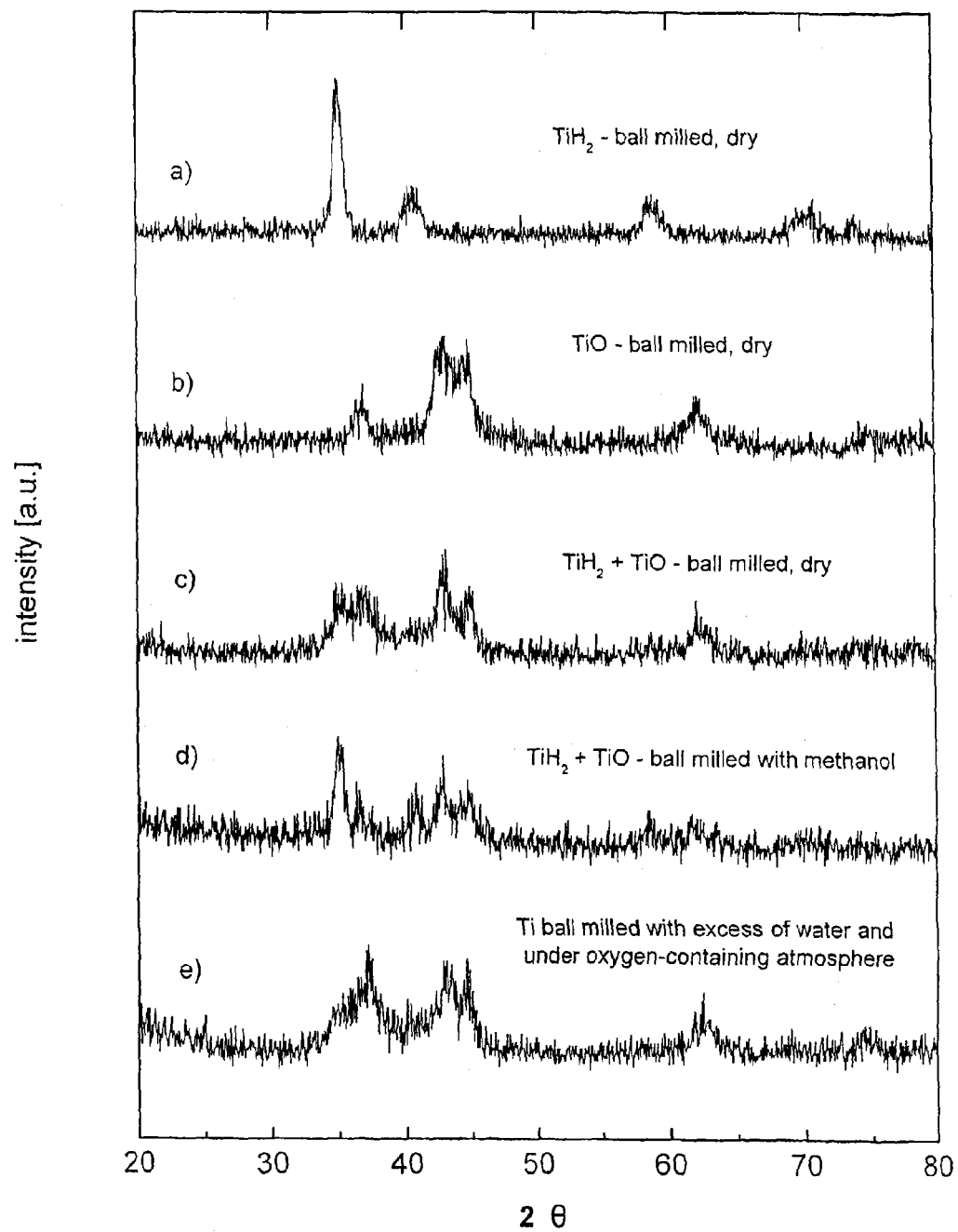
FIG. 1 illustrates x-ray diffraction patterns referred to in Example 1 of a Ti-based catalyst ntion and that of comparative materials.

The present invention relates to a composition of matter characterized by a particular atomic configuration. The composition of matter is useful for effecting improved hydrogen transfer kinetics in various kinds of chemical reactions which depend on the efficiency of hydrogen relocation or exchange. In this respect, such composition of matter of the present invention can be described as a "hydrogen transfer facilitator". Where this composition of matter is not consumed in these chemical reactions, the hydrogen transfer facilitator can also be described as a catalyst. Examples of such reactions whose reaction kinetics may be improved by this hydrogen transfer facilitator include: (i) hydrogenation and dehydrogenation of a wide spectrum of compounds, including simple and complex metal hydrides, hydrocarbons and various organic compounds, reforming of hydrocarbons, alcohols, polymerization, cracking and hydrolysis, (ii) electrochemical reactions, including anodic and cathodic reactions, and electrolysis of water and salts, (iii) reactions in fuel cells, and (iv) reduction/oxidation reactions.

Although not wishing to be bound by theory, it is believed that the ability of the composition of matter of the subject invention to effect improved hydrogen transfer kinetics is attributable to the fact that the hydrogen transfer facilitator is characterized by at least one kind of specific atomic co-ordination. Again, not wishing to be bound by theory, it is believed that at least one of these specific kinds of subject atomic co-ordinations can be described in accordance with the following structural formula:

(M+M1)-H-E (1)

wherein:

M is a metal or metalloid, or an alloy thereof, or a compound thereof, or a homogeneous or inhomogeneous combination of at least two of a metal or a metalloid, or an alloy thereof, or the compound thereof. Examples of suitable metals and metalloids include: Li, Na, K, Be, Mg, Ca, Y, Sc, Ti, Zr, Hf, V, Nb, Ta, Pt, Pd, Ru, Rh, Ge, Ga, In, La, Ce, Pr, Nd, Dy, Al, Si, and B.

M1 is an optional other metal, or an alloy thereof, or a compound thereof, or a homogeneous or inhomogeneous combination of at least two of a metal, or an alloy thereof, or a compound thereof. Examples of suitable metals include: Cr, Mo, W, Mn, Fe, Co, Ir, Ni, Cu, Ag, Au, Zn, Sn, Pb, Sb, and Bi.

H is hydrogen

E is an electronegative element, such as O, F, N, Cl, S, P, C, Te, I, Br. Examples of suitable compounds which can function as sources of such elements include oxides, nitrides, halides, sulphides, tellurides, phosphides, including mixed compounds, such as CO and NO. Other suitable compounds of the enumerated electronegative elements include those co-ordinated with hydrogen atoms, such as water, hydroxides, phenols, alcohols, salts, acids, alkoxides, thiols, organic acids, salts of organic acids, acid amides, amines, acid halides, alkyl halides, sulphones, and organometallics;

and wherein hydrogen bonding exists between H and E.

Once again, and not wishing to be bound by theory, it is also believed that the hydrogen transfer facilitator has two further atomic co-ordinations which effects improved hydrogen transfer, and that such atomic co-ordinations can be described in accordance with the following structural formulae:

M-H-E (2)

M-H—H (3)

wherein M, H, and E have the same meanings as in (1), and wherein in (2), hydrogen bonding exists between M and H, and wherein in (3), hydrogen bonding exists between H and H.

These types of atomic co-ordinations are generally recognized and described by L. Bramer, "Direct and Indirect Roles of Metal Centres in Hydrogen Bonding", eds. J. A. K. Howard, F. H. Allen and G. P. Shields; NATO ASI Series E: Applied Sciences 1999, 360, 197-210, Kluwer Academic Publishers, Dordecht, Netherlands.

The composition of matter of the present invention can be made by, firstly, combining (i) a metallic substance (i.e. a metalliferous material), and (ii) a source of hydrogen, to form a first intermediate.

The metallic substance can be a metal or a metalloid, or an alloy thereof. In this respect, the metallic substance can be a metal, or an alloy of the metal, or a compound of the metal. Additionally, the metallic substance can be a metalloid, or an alloy of the metalloid, or a compound of the metalloid.

The metallic substance can be a homogeneous or inhomogeneous combination of at least two of a metal or a metalloid, or an alloy thereof, or a compound thereof. In this respect, the combination is at least two of any of the following: a metal, an alloy of the metal, a compound of the metal, a metalloid, an alloy of the metalloid, or a compound of the metalloid.

The first intermediate is then milled to effect reaction between the metallic substance and the hydrogen. As a result of the reaction, the hydrogen becomes bonded to the metallic substance as a second intermediate. The second intermediate is then combined with a source of an electronegative element. Such combination is then milled to effect reaction between the second intermediate and the electronegative element to form the resultant composition.

Examples of suitable metallic substances, and electronegative elements and their sources, are described above.

The milling operations must be able to impart sufficient impact energy to effect the reaction between hydrogen and the metallic substance, as well as the reaction involving the electronegative component. In this respect, in one embodiment, a mechanical grinding or milling can be carried out in a high energy ball mill. Suitable ball mills include tumbler ball mills, planetary ball mills, and attrition ball mills. The mechanical treatment imparted by such milling operations provides enhanced reactivity of the reagents, by means of the continuous creation of fresh surfaces unaffected by oxides and hydroxides, and introduces local stress and deformation which is believed to enhance the rate of reaction.

Preferably, each of the above described reactions is preferably carried out in a substantially inert gaseous environment in order for the desired reaction between the metallic substance and hydrogen to take place. In this respect, the reaction between the metallic substance and hydrogen is preferably carried out in a gaseous environment having an insufficient concentration of an oxidizing agent to effect deleterious oxidation of the metallic substance. The presence of the oxidizing agent interferes with the reaction between the metallic substance and hydrogen. Deleterious oxidation of the metallic substance occurs when the metallic substance reacts to an unacceptable degree with an oxidizing agent (eg. oxygen) so as to significantly interfere with reactivity of the metallic substance with hydrogen. Unacceptable degree of reaction varies depending on the circumstance. In the context of hydrogen storage compositions, oxidation becomes unacceptable where the resultant composition does not possess sufficient catalytic activity to justify the space it is occupying.

The reaction between the metallic substance-hydrogen intermediate with the electronegative element is preferably carried out in a gaseous environment having an insufficient concentration of a reducing agent to effect deleterious reduction of the subject intermediate product. Such reducing agent would otherwise interfere with the reaction between the electronegative element and the intermediate. Deleterious reduction of the metallic substance occurs when the metal-hydrogen co-ordination of a reactive intermediate (a precursor to the hydrogen transfer facilitator) reacts to an unacceptable degree with a reducing agent so as to significantly interfere with the reactivity between the intermediate and the electronegative element. In the context of hydrogen storage compositions, reduction becomes unacceptable where the resultant composition does not possess sufficient catalytic activity to justify the space it is occupying.

The composition of matter may also be prepared from a hydride of a metallic substance (i.e. hydride of a metalliferous material). A hydride of a metallic substance can be directly reacted with the electronegative element to form the composition of matter of the subject invention without having to first undergo a reaction with hydrogen. In this respect, the present invention also provides a composition of matter prepared in accordance with a method comprising: (a) combining a hydride of a metallic substance with a source of an electronegative element, to form a first intermediate; and (b) milling the first intermediate to effect reaction between (i) the hydride of the metallic substance, and (ii) the electronegative element. Suitable metallic substances (i.e. metalliferous materials) are as described above.

In one embodiment, the composition of matter may be prepared by milling the metallic substance described above, or the hydride of the metallic substance described above, with a liquid, such as water or an alcohol or mixtures thereof. In this respect, the present invention further provides a composition of matter prepared in accordance with a method comprising: (a) combining a metallic substance as described above, or a hydride of the metallic substance described above, with a liquid selected from the group consisting of water and alcohols and mixtures thereof, to form a first intermediate, and (b) milling the first intermediate.

When the term "essentially" is used with respect to any of the above-described embodiments of the present invention, this means that other materials may be present in small quantities. These other materials are present as impurities introduced into composition as by-products arising during processing or from the raw materials. These other materials are present in amounts which are not sufficiently significant to effect the desired properties of the alternately formed composition. In particular, the impurities are present in amounts which do not compromise the functionality of the hydrogen transfer facilitator or catalyst to appreciably improve the kinetics of hydrogen transfer in hydrogenation and/or dehydrogenation reactions.

Preferably, the liquid consists essentially of any of (i) water, (ii) at least one alcohol, or (iii) any combination thereof.

The liquid can function as a source of hydrogen as well as a source of the electronegative element. As the source of hydrogen, the liquid provides the hydrogen to create the metallic substance-hydrogen co-ordination of the intermediate to the hydrogen transfer facilitator of the present invention. Once the metallic substance-hydrogen co-ordination is created, the liquid can then provide the electronegative element to react with the metallic substance-hydrogen intermediate to create the hydrogen transfer facilitator of the present invention. An example of a suitable compound which functions as the source of hydrogen as well as the source of the electronegative element is liquid water.

Alternatively, the liquid can function only as a source of the electronegative element. When the metal substance-hydrogen co-ordination is already present, such as in the case of a hydride of a metallic substance, the liquid can function as a source of the electronegative element to react with the metallic substance-hydrogen co-ordination of the hydride of the metallic substance to create the hydrogen transfer facilitator of the present invention.

Preferably, excess of liquids relative to metal substances should be avoided. This is because excess liquids could interfere with reaction mechanisms between the metallic substance and hydrogen, thereby leading to a reduction of the catalytic capability of the ultimately-formed composition of matter (hydrogen transfer facilitator). In this respect, preferably, the molar ratio of the liquid to the metallic substance is less than 1:1.

The hydrogen transfer facilitator may also be formed by contacting the metallic substance as described above with gaseous reagents to effect the necessary transformations which form the desired atomic co-ordination. In this respect, the solid metallic component can be exposed to hydrogen and oxygen (or chlorine, or fluorine, or nitrogen) in the gas phase. However, instead of applying the gas mixture, a sequence of gas admission steps is applied. The process involves, for example, exposure to hydrogen under certain conditions of temperature and pressure, which results in hydrogen adsorption or absorption, through the metal surface. It is then followed by the admission of the other gas under certain conditions of temperature and pressure. In order to finally form the required atomic configuration according to the invention, either complete oxidation or complete reduction of the metallic component should be avoided in the process, in order for both basic components (hydrogen and the electronegative element) to be present in the metallic complex.

In order to improve and control the reactivity of the metallic component and the efficiency of the formation of the catalytic complexes, this solid-gas reaction is performed preferably in a ball mill. In this process, the milling of the metallic powder proceeds consecutively under the atmosphere of hydrogen, followed by ball milling under oxygen (or chlorine, or other gases), performed in a precisely defined sequence of conditions. As indicated above, instead of a metallic component, an already hydrogenated metallic component can be used as a starting material, or even a previously formed hydride (or a mixture of hydrides).

The hydrogen transfer facilitator may even further be formed by contacting the metallic substance with solid reagents to effect the necessary transformations which form the desired atomic co-ordination. In this case, at least one of the components among hydrogen and the electronegative element is introduced in the form of a solid compound, for example a solid hydrocarbon, such as solid polymer, or oxide, chloride, fluoride, sulfide, carbide, telluride or iodide, alkoxide etc. Hydrides, hydroxides, solid acids, bases, or other compounds can be also used as hydrogen- and electronegative element-sources. These compounds can also contain metals or metalloids either different or the same as the main (M+M1) components. As above, the most effective way of producing the required catalytic complexes is to use a high-energy ball mill, providing a solid-state reaction between the metallic element (either previously hydrogenated or not) and the solid source of the electronegative element and hydrogen. The hydrogen source (for example a solid hydrocarbon, a hydride) can be at first introduced to the metallic element. Subsequently, a source of an electronegative element is added in a second stage, for example, an oxide. In a one-stage process, a specific combination of solid carriers supplying the hydrogen and/or the electronegative element can be used, for example a mixture of an oxide and a hydride, a mixture of alkoxides, oxides, chlorides, etc. A specific example of the process in the solid state is when a solidified source of hydrogen and of the electronegative element is introduced, for example water in the form of ice, which can also be performed at adequately low temperatures.

All the above-described methods can be used in various combinations, depending on the specific formula of the catalytic complex. For example, solid hydride can be milled under gaseous oxygen, liquid fluoride can be milled with a hydrogenated metallic alloy, or gaseous hydrogenation can be performed in a ball mill, then followed by ball milling with water, or with a solid hydrocarbon.

The compositions of matter of the present invention, which function as hydrogen transfer facilitators, are preferably in particulate form, having a particle size less than 100 microns, and also being characterized by the fact that 80% of the particles have a particle size less than 50 microns. Preferably, the particles possess nanocrystalline characteristics, such that the grain size of the particles is less than 100 nm.

The compositions as prepared above preferably have an X-ray diffraction pattern that exhibits a characteristic Bragg's reflection of a co-ordination of (i) a metal or metalloid, and (ii) hydrogen.

As mentioned above, the composition of matter of the present invention can be used as a hydrogen transfer facilitator for effecting the hydrogenation and dehydrogenation of a metal hydride or hydrogenation of unsaturated organic compounds.

To effectively function as a hydrogen transfer facilitator for improving the kinetics of hydrogenation and dehydrogenation in the context of hydrogen storage materials, the hydrogen facilitator must be integrated, or intermixed, with the substance being hydrogenated and dehydrogenated. In this respect, a hydrogen storage composition of the present invention can be prepared by combining the hydrogen transfer facilitator, as described above, with (a) a hydride of a metallic substance (i.e. metalliferous material), the metallic substance being selected from the group consisting of a metal or a metalloid, or an alloy thereof, or a compound thereof, or a homogeneous or inhomogeneous combination of at least two of a metal or a metalloid, an alloy thereof, or a compound thereof, or (b) a hydrogen absorbing metallic substance (i.e. metalliferous material) selected from the group consisting of a metal or a metalloid, or an alloy thereof, or an homogeneous or inhomogeneous combination of at least two of a metal or a metalloid, or an alloy thereof, or a compound thereof, such combining effecting sufficient contact between the hydrogen transfer facilitator and the metallic substance so that the hydrogen transfer facilitator is configured to effect absorption or desorption of hydrogen by the metallic substance. The hydrogen absorbing metallic substance is configured for transforming into a hydride upon absorption of hydrogen.

The hydrogen transfer facilitator can be combined with the metallic substance by way of mechanical alloying through ball milling. Relative to the intensity of milling required to effect formation of the hydrogen transfer facilitator catalyst, lower milling intensity may be used for intermixing of the hydrogen transfer facilitator and the metallic substance. The hydrogen transfer facilitator can also be intermixed with the metal hydride or hydridable metal using other methods such as mixing, spraying, deposition, condensation, compaction, sintering, and co-sintering.

It is understood that compounds within the above-described metallic substances to which the hydrogen transfer facilitator is combined include simple metal hydrides and complex metal hydrides.

Once combined with the metal hydride or hydridable metal, the hydrogen transfer facilitator can enhance the kinetics of hydrogenation and/or dehydrogenation of the hydrogen storage composition. Hydrogenation is the process whereby hydrogen is absorbed by the hydrogen storage composition. Hydrogenation is not intended to indicate that complete hydrogenation of the hydrogen storage composition has necessarily occurred, and contemplates both a complete hydrogenation and a partial hydrogenation resulting from the absorption of hydrogen by the hydrogen storage composition.

In contrast, dehydrogenation is the process whereby hydrogen is desorbed by the hydrogen storage composition. Dehydrogenation is not intended to indicate that complete dehydrogenation has necessarily occurred, and contemplates both a complete dehydrogenation and a partial dehydrogenation resulting from the desorption of at least a part of the hydrogen content of the hydrogen storage composition.

Absorption of hydrogen by the metallic substance refers to the association of hydrogen with a metallic substance. Other mechanisms for association include dissolution, covalent bonding, or ionic bonding. Dissolution describes a process where hydrogen atoms is incorporated in the voids of a lattice structure of a metal or intermetallic alloy. Examples of such metal hydrides include vanadium hydrides, titanium hydrides and hydrides of vanadium-titanium alloys. An example of a covalently bonded hydride is magnesium hydride. Example of ionically bonded hydrides are sodium hydride and lithium hydride. Association of hydrogen in a complex metal hydride has been described or partially covalent/partially ionic. Such association has been more particularly described in Haubach et al., "Accurate Structure of $LiAlD_4$ Studied by combined powder and x-ray diffraction", Journal of Alloys and Compounds 346 (2002) 184-189 Elsevier Science B.C.

In the process of the preparation of the hydrogen transfer facilitator it is preferable to precisely control the electronegative element contribution, both in the way of its introduction and in the amount. One method of controlling the exact amount of the electronegative element in the preparation process is to use additional components that have the ability to either provide the electronegative element (e.g. being oxygen donors through their in-situ reduction) or eliminate the excess of the electronegative element (through in-situ oxidation which prohibits detrimental oxidation of the metallic component). As shown in the examples, such oxygen-donating components could be, for example, copper oxide (which becomes reduced to copper during the process of the catalyst preparation) or zinc or aluminum (which become oxidized when necessary, instead of the destructive oxidation of the main metallic component).

Any of the above-described hydrogen storage compositions may also be useful in a method of producing an aluminum foam. Methods of producing an aluminum foam are known. Metal foams are cellular materials containing a high proportion of regularly sized and spaced voids. An example of an aluminum foam is Stabilized Aluminum Foam™ ("SAF") produced by Cymart Corp.

Two types of foam exist: closed-cell and open-cell. Closed-cell forms, such as SAF, are characterized by solid faces which define individual cells such that each cell is sealed from neighbouring cells. Open-cell foams contain the cell edges only.

One method of making a closed-cell aluminum foam is to combine titanium hydride ($TiH_2$) with molten aluminum. Upon combining titanium hydride with molten aluminum (at above 465° C.), $TiH_2$ decomposes into Ti and gaseous hydrogen. The produced gaseous hydrogen is in the form of bubbles, such created bubbles leading to the termination of a closed-cell foam.

In one embodiment of a method of producing an aluminum foam, or a molten metalliferous material comprising aluminum, or consisting essentially of aluminum, is provided having a temperature effective to effect desorption of gaseous hydrogen from any of the hydrogen storage compositions described above. The metalliferous material is then combined with any of the hydrogen storage compositions described above. Such combination effects heating of the hydrogen storage composition so as to effect dehydrogenation of the hydrogen storage composition.

In one embodiment, the metalliferous material comprises aluminum, and alloy thereof, or a compound thereof. The metalliferous material can also comprise an homogeneous or inhomogeneous combination of aluminum and at least one other metalliferous material selected from any of a metal or a metalloid, or an alloy thereof, or a compound thereof.

Any of the above-described hydrogen transfer facilitators of the present invention can also be combined with a hydride to enhance the kinetics of chemical reaction of the metal hydride with a proton containing reactant, wherein such reactant effects the generation of gaseous hydrogen. In this respect, in one embodiment, the present invention provides a method of generating gaseous hydrogen from a hydrogen storage composition comprising:

(a) combining a hydrogen-containing metalliferous material with a hydrogen transfer facilitator to form the hydrogen storage composition, wherein the hydrogen containing metalliferous material is selected from the group consisting of an hydride of (i) a metal or a metalloid, or an alloy thereof, or a compound thereof, or (ii) an homogeneous or an inhomogeneous combination of a metal or a metalloid, or an alloy thereof, or a compound thereof;

and wherein the hydrogen transfer facilitator is prepared in accordance with a method comprising the steps of:

(a) combining (i) a metalliferous material selected from the group consisting of: (A) a metal or a metalloid, or an alloy thereof, or a compound thereof, or an homogeneous or an inhomogeneous combination of at least two of a metal or a metalloid, or an alloy thereof, or a compound thereof, or (B) a hydride of any of: a metal or a metalloid, or alloy thereof, or a compound thereof, or an homogeneous or an inhomogeneous combination of a metal or a metalloid, or an alloy thereof, or a compound thereof, with ii) a liquid consisting essentially of any of: water, at least one alcohol, or a mixture of water and at least one alcohol, to form a first intermediate; and (b) milling the first intermediate;

(b) contacting the hydrogen storage composition with a proton containing reactant effective to chemically react with the hydrogen storage composition to produce gaseous hydrogen. In one embodiment, the metalliferous material is any of $NaBH_4$, $LiAlH_4$, or $NaAlH_4$. The proton containing reactant can be any of $H_2O$, $H_2O_2$, $NH_3$, $H_2S$, or an alcohol, or any combination thereof.

The present invention will be described in further detail with reference to the following non-limitative examples.

EXAMPLES

Example 1

Ti-Based Catalyst Prepared by Reaction with Methanol

A Ti-based catalyst was produced both from titanium powder and titanium hydride. Both methods gave equally good catalytic capability of the resulting catalyst so long as deleterious oxidation of titanium was prevented.

Commercial titanium hydride ($TiH_2$) was used as a starting material, and was purchased from Aldrich (purity 98%, powder −325 mesh). X-ray diffraction pattern of this hydride was created using a Bruker D8 Discover X-ray diffraction system (as was the case for all X-ray diffraction results discussed herein) and is shown in FIG. 1a. The X-ray diffraction pattern exhibits a characteristic set of Bragg's reflections consistent with the International Centre for Diffraction Data database PDF-2, card number 65-0934.

One gram of titanium hydride was loaded into a stainless steel vial together with approximately 1 ml of methanol (methyl alcohol HPLC grade 99.9%) and stainless steel balls, giving a ball-to-powder ratio of about 16:1 on a weight basis. The loading was done in a glove box with protective argon atmosphere (less than I ppm of oxygen and less than 1 ppm of water). Subsequently, the vial was mounted in a high-energy ball mill (SPEX CentriPrep 8000M Mixer/Mill). This milling device provides violent and complex movements in three mutually perpendicular directions, with frequency of about 1200 cycles/minute. Ball milling was performed for 9 hours, with particular care about perfect sealing of the vial. After the process, the material turned into deep-black, very fine powder, without visual presence of the liquid phase. Instead, a significant weight increase of the powder was observed, of the order significantly exceeding any possible contamination from the vial. FIG. 1b shows x-ray diffraction pattern of the resulting powder (i.e. the "new catalyst"). The pattern shows no apparent transformation of the basic crystallographic structure of the hydride (all Bragg's reflections remain at similar 2θ positions as those characteristic for the original hydride structure). Also, no additional phase can be seen in the diffraction pattern (no additional Bragg's reflections). In particular, none of the normally expected reaction products, namely oxide phase or alkoxide phase, appeared to be present.

In FIGS. 1c and 1d, x-ray diffraction patterns for commercial TiO (purchased from Alpha Aesar, purity 99.5%, −325 mesh powder) and for titanium methoxide $Ti(OCH_3)_4$ $(CH_3OH)_x$ (purchased from Alpha Aesar, purity 95% powder) are given for comparison. By comparison, the only apparent difference in the x-ray diffraction pattern of the new catalyst is a significant widening of the Bragg's reflections, which is usually interpreted as a result of increased level of strain, defects, and formation of the nanocrystalline structure. These are all common features, often seen in ball milled materials.

Figure 2:
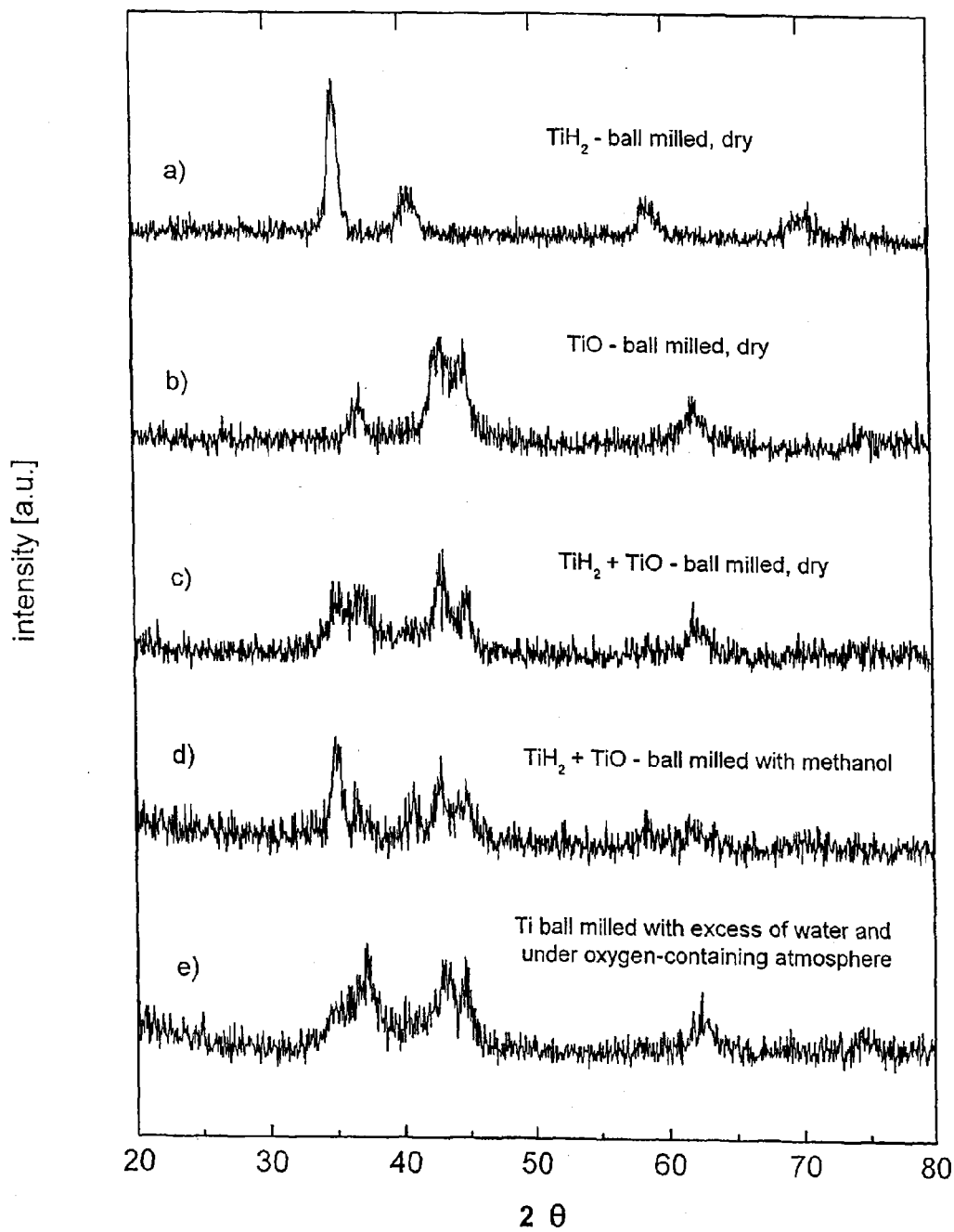
FIG. 2 illustrates x-ray diffraction patterns referred to in Example 1 of comparative materials to the Ti-based catalyst.

X-ray diffraction data for the new Ti-based catalyst was compared to that of materials comprising similar elements, with a view to understanding the structure and co-ordination of the Ti-based catalyst. The following comparative materials were prepared: $TiH_2$ ball milled without any additions, ball milled TiO, a mixture of $TiH_2$ and TiO ball milled without additions, the same mixture of $TiH_2$ and TiO but ball milled with methanol, and Ti milled with excess of water and under oxygen-containing atmosphere. All these materials were prepared under identical ball milling conditions as for the formation of the Ti-based catalyst, with the same parameters as above, and using the same technique of loading and handling. FIG. 2 illustrates x-ray diffraction patterns of these materials, of which only one—dry $TiH_2$—has x-ray diffraction pattern similar to the new catalyst, proving that, indeed, the local crystallographic arrangement of the Ti-based catalyst prepared above the required Ti—H coordination similar to that in the $TiH_2$.

Catalytic properties of the above Ti-based catalyst was assessed with respect to the hydrogenation of titanium, i.e. in the process of formation of titanium hydride. According to "Compilation of IEA/DOE/SNL Hydride Databases" by G. Sandrock and G. Thomas http://hydpark ca sandia.gov, titanium hydride can be formed by direct reaction with $H_2$ gas, but "must be heated to 400-600° C. to activate" and can be "easily deactivated by impurities such as $O_2$ and $H_2O$".

The Ti-based catalyst was next incorporated or bonded with titanium powder, to assess hydrogen absorption kinetics. Titanium powder was purchased from Alpha Aesar, with 99.5% purity, −325 mesh powder. Titanium powder was mixed with 10 wt. % of the new Ti-based catalyst (prepared as above) and ball milled for a short period of time (less than 1 hour) in order to provide good distribution of the catalyst over titanium powder.

Hydrogen absorption capabilities of the material (and all other materials herein) were measured in an automated, computer controlled gas titration system, which allows precise evaluation of hydrogen uptake and release by measuring pressure changes in a closed system.

Figure 3:
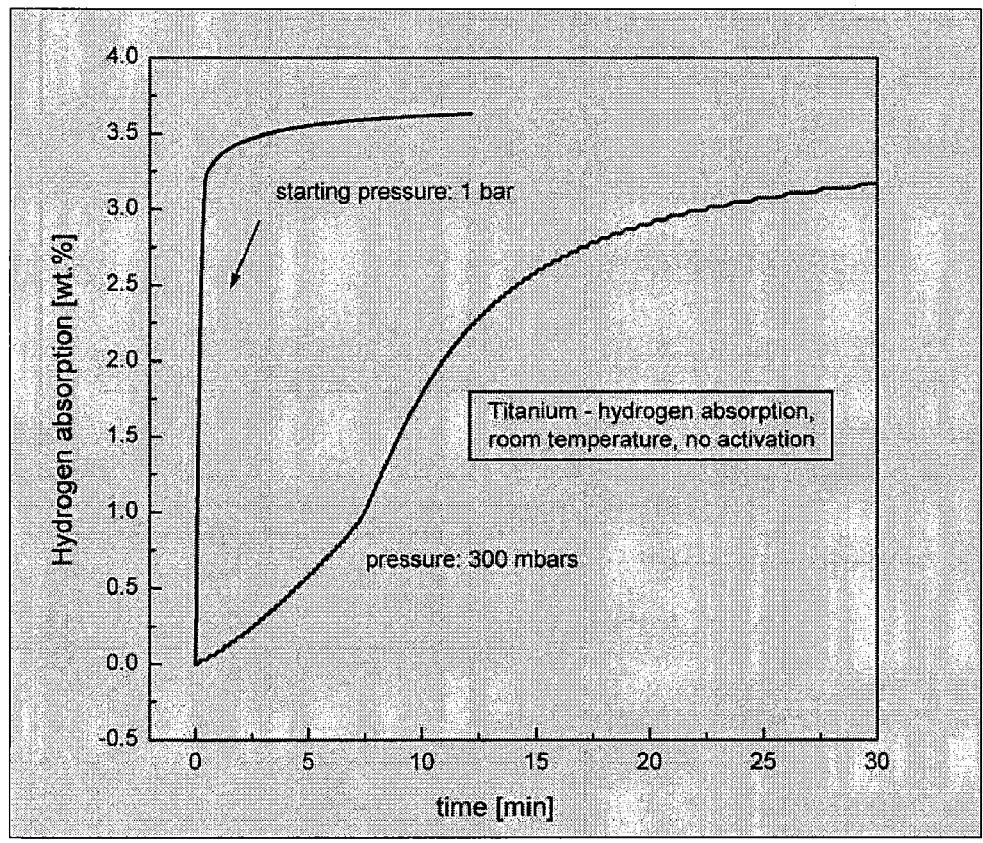
FIG. 3 illustrates hydrogen absorption referred to in Example 1 of a Ti/Ti-based catalyst system.

In contrast to conventional titanium which requires high-temperature activation, titanium powder catalyzed by the new titanium-based catalyst exhibited very fast (within about 20 seconds) formation of titanium hydride at room temperature, without any activation or preheating, as shown in FIG. 3. The hydrogen pressure used for hydrogenation was relatively very low, less than 1 bar, and decreased to about 0.4 bars due to hydrogen consumption during absorption. In a parallel experiment at room temperature, hydrogen pressure used for absorption was as low as 300 mbars, and the formation of titanium hydride occurred within less than 30 minutes, as shown in FIG. 3b, again without any activation or preheating.

Figure 4:
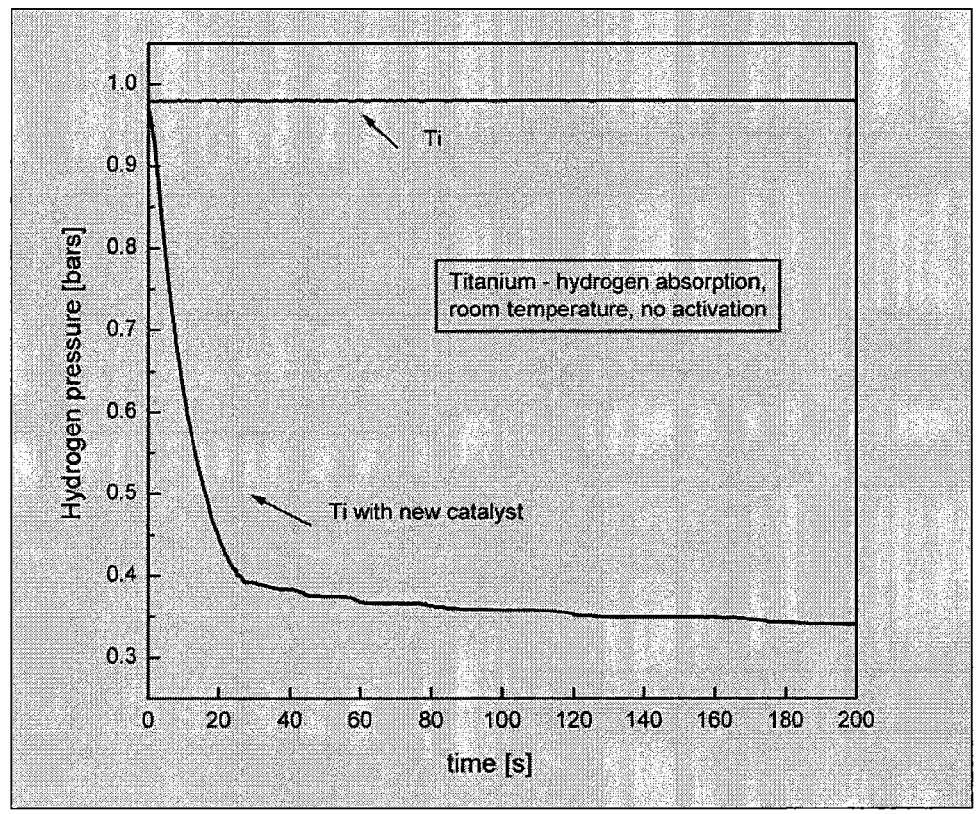
FIG. 4 illustrates hydrogen absorption referred to in Example 1 of a Ti/Ti-based catalyst system and that of comparative materials.
Figure 5:
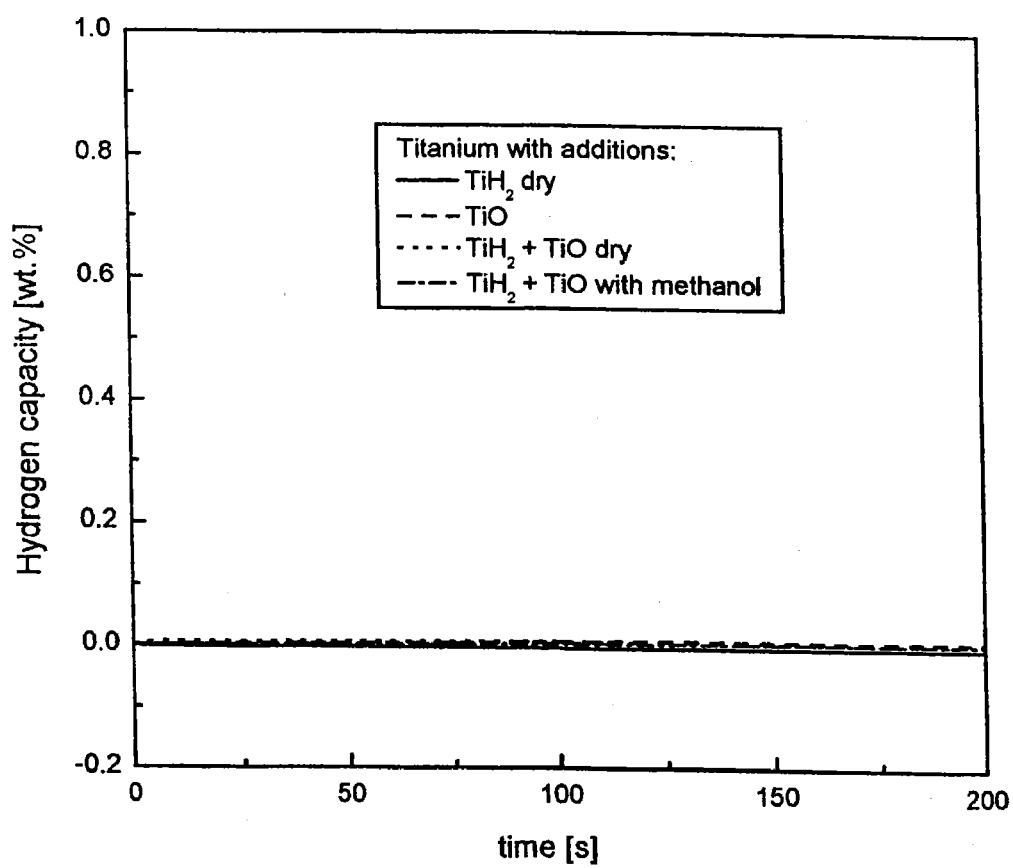
FIG. 5 illustrates hydrogen absorption referred to in Example 1 of comparative materials to the Ti/Ti-based catalyst system.

In comparative experiments, a first sample of titanium powder was subject to short ball milling (1 hour) with no additions, and a second sample of titanium powder was intermixed by short ball milling (I hour) with additions of the before-mentioned comparative materials (dry, ball milled $TiH_2$, ball milled TiO, a mixture of $TiH_2$ and TiO ball milled without additions, the same mixture of $TiH_2$ and TiO but ball milled with methanol, and Ti milled with excess of water and under oxygen-containing atmosphere). These additions were introduced to the titanium powder by using the same procedure as used for the new Ti-based catalyst, and were subsequently exposed to about 1 bar of hydrogen pressure in the gas titration system. As shown in FIGS. 4 and 5, neither titanium alone, nor with any of the above additions, showed measurable hydrogen absorption within the period of time required by the Ti-based catalyst system to be fully charged.

Figure 6:
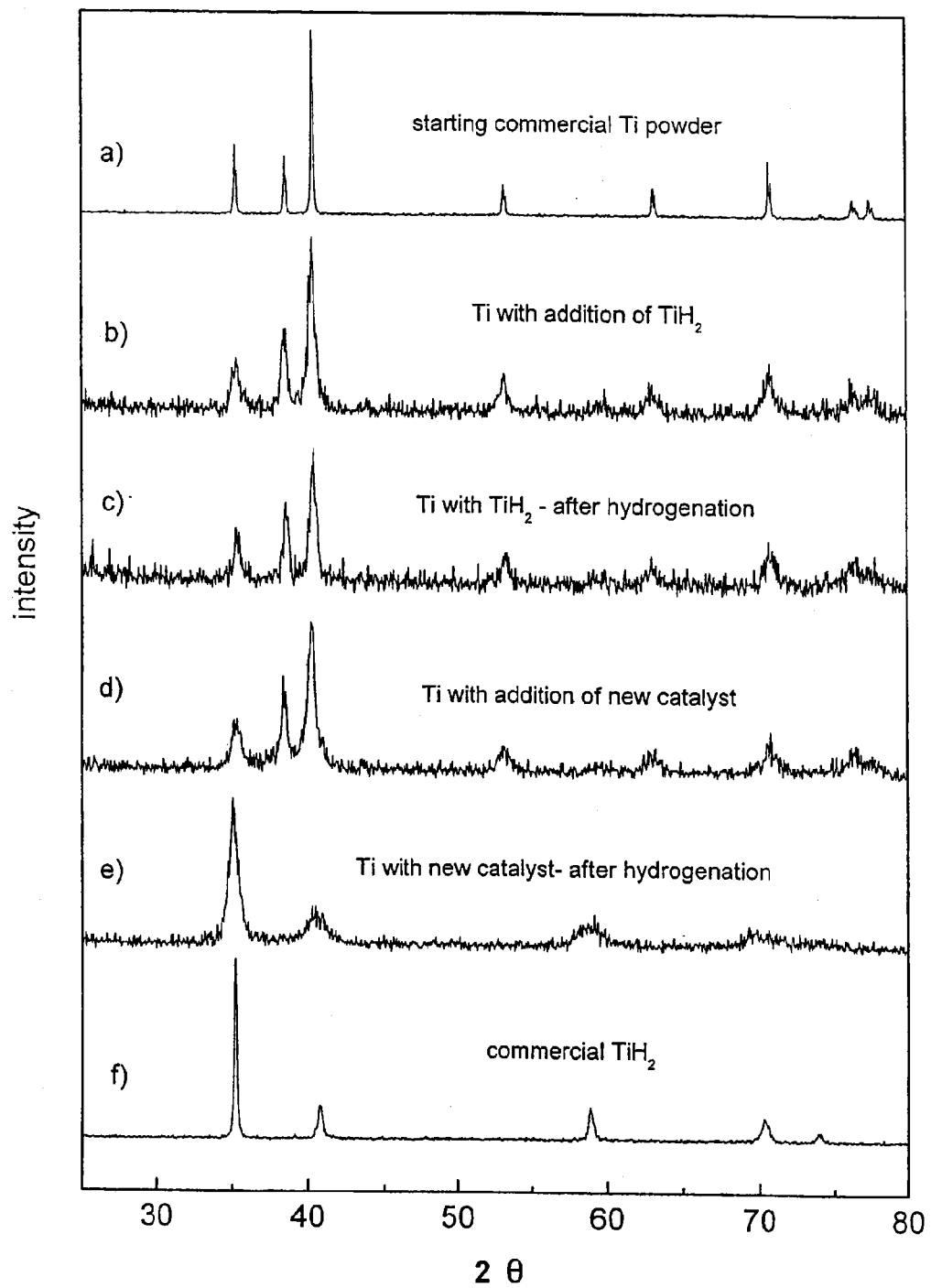
FIG. 6 illustrates x-ray diffraction patterns referred to in Example 1 of a hydrogenated Ti/Ti-based catalyst system and that of comparative materials.

FIG. 6 shows x-ray diffraction patterns which confirm the hydrogenation measurements of Ti in the Ti-systems studied above. FIG. 1a illustrates x-ray diffraction pattern of the initial Ti powder (consistent with the International Centre for Diffraction Data database PDF-2, card number 89-5009). FIGS. 6b and 6d illustrate x-ray diffraction patterns for (i) Ti intermixed (by using short ball milling described above) with dry, ball milled $TiH_2$ after hydrogenation (FIG. 6b), and (ii) Ti intermixed (by using short ball milling described above) with the new catalyst (FIG. 6d). Although no apparent differences can be seen between these two materials in their initial state before hydrogenation, there was a fundamental difference in their hydrogenation behaviour. While dry $TiH_2$ was inactive as a catalytic addition (and titanium powder remained unchanged after hydrogenation attempts as shown in pattern 6c), the new catalyst, formed in the manner described above, caused full transformation of titanium into titanium hydride, as shown in diffraction pattern in FIG. 6e. Commercial $TiH_2$ pattern is shown in FIG. 6f for comparison.

These particular results (i.e. the exceptional catalytic ability of the new Ti-based catalyst, as compared for example with dry $TiH_2$) oppose common understanding of the activation of titanium system (as for example in the Sandrock's Hydride Database, where "the presence of $O_2$ or $H_2O$ should deactivate titanium at low temperature"). The new catalyst (which is not only assumed to contain oxygen, but, in some embodiments, is produced using water, or water-alcohol mixtures) not only does not deactivate titanium but instead causes exceptional kinetics for titanium hydrogenation without any activation and at room temperature under very low hydrogen pressures.

Example 2

A Zr-Based Catalyst

Zirconium-based catalysts according to the invention can be produced from both zirconium and zirconium hydride. In general, it involves formation of the Zr—H atomic configuration, complemented by introduction of the electronegative element. For example, the electronegative element can be derived from a liquid such as water or alcohol, or from, for example, metal oxides. Similar to the above examples using titanium, a variety of processes can be effectively applied in the preparation of the Zr-based catalysts.

Figure 7:
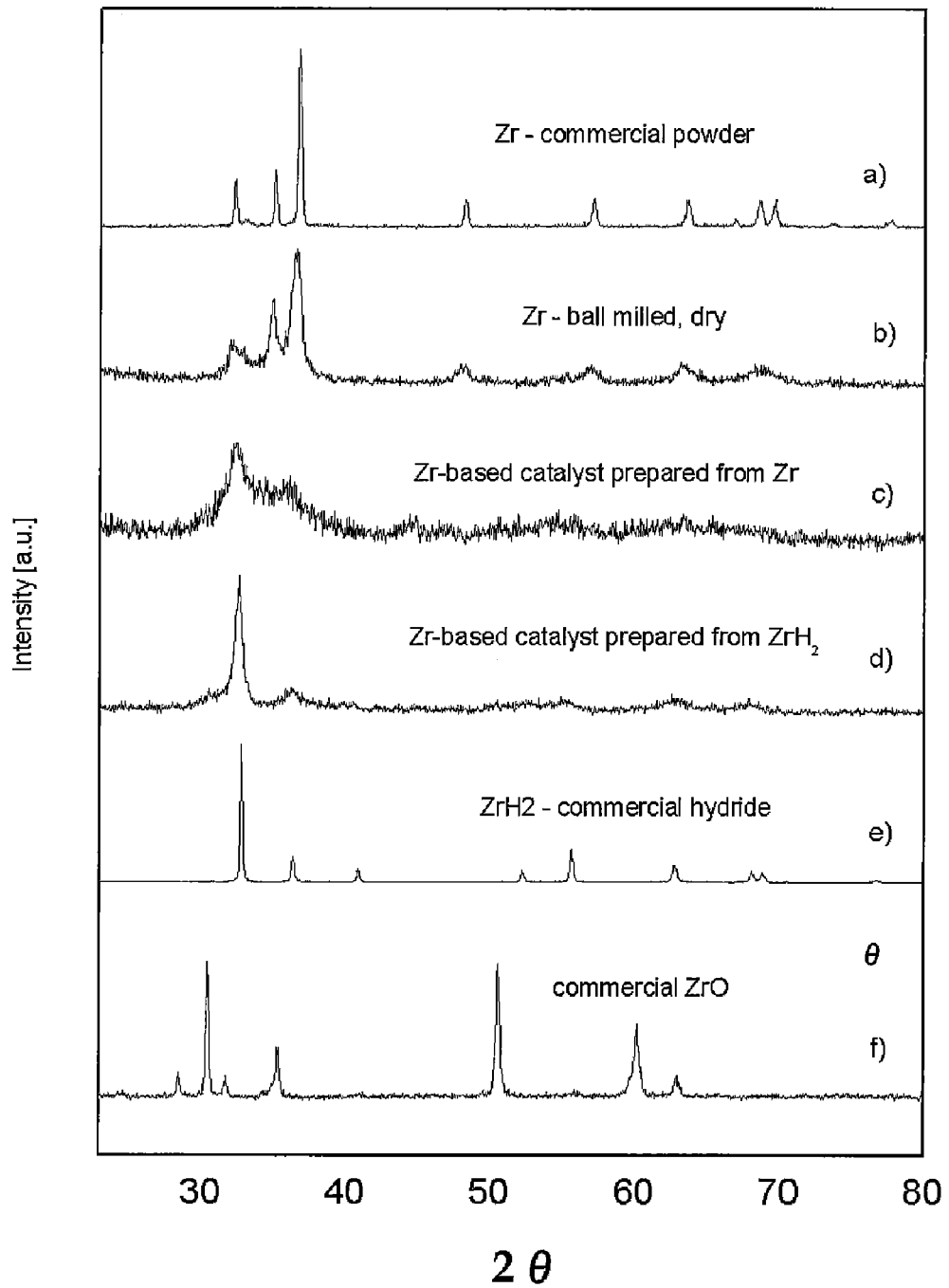
FIG. 7 illustrates x-ray diffraction patterns referred to in Example 2 of Zr-based catalysts and that of comparative materials.

In the current example, zirconium powder was purchased from Alpha Aesar (with purity 95+%, average powder size 2-3 micron, packaged in water). The disadvantage of metallic zirconium is that it is very sensitive to oxidation. Since normally zirconium does not react with water, packaging in water is the most common method of protecting Zr from deterioration in air. Although in some cases water can be used as a reagent in the process of preparation of Zr-based catalyst, dried zirconium was always used as a starting material in order to fully control the amount of water added. The first step of the experiment was to dry commercial zirconium powder overnight under vacuum, with continuous pumping. FIG. 7a shows x-ray diffraction pattern of the dried commercial zirconium powder. The structure of Zr is reflected in its characteristic set of Bragg's reflections, which is consistent with the International Centre for Diffraction Data database PDF-2, card number 894892. Prepared zirconium powder was subsequently used as starting material for the formation of new Zr-based catalysts, which involved ball milling of Zr with water or alcohol, and also with metal oxides or metals. In order to differentiate the processes according to the invention from the effects of ball milling only, Zr powder alone was subjected to ball milling under similar conditions as in the catalyst preparation experiments (described below). As seen in FIG. 7b, which shows x-ray diffraction pattern of the ball-milled zirconium, the effects of ball milling are limited to the usual features of Bragg's reflection broadening, caused by introduction of stress, defects and nanocrystalline structure.

800 mg of dried zirconium powder was loaded into a stainless steel vial together with approximately 0.35 ml of methanol (methyl alcohol HPLC grade 99.9%) and stainless steel balls, giving a ball-to-powder ratio of about 20:1 on a weight basis. The loading was done in a glove box with protective argon atmosphere (less than 1 ppm of oxygen and less than 1 ppm of water), with particular care about perfect sealing of the vial. Subsequently, the vial was mounted in a high-energy ball mill (SPEX CentriPrep 8000M Mixer/Mill). Ball milling was performed for 9 hours. After the process, there was no visual presence of the liquid phase, and the product was a black, very fine powder. A significant weight increase of the powder was observed. FIG. 7c shows x-ray diffraction pattern of the resulting material (i.e. the new Zr-based catalyst). The pattern clearly shows a crystallographic structure different from that of zirconium (FIGS. 7a and 7b) and can be interpreted as a zirconium hydride crystallographic configuration, since all Bragg's reflections occur at similar 2θ positions as those characteristics for the zirconium hydride structure, in accordance with the International Centre for Diffraction Data database PDF-2, card number 65-0745. A very similar pattern (although with relatively sharper Bragg's reflections, as shown in FIG. 7d) was obtained in another experiment, where zirconium hydride $ZrH_2$ was used as a starting material instead of zirconium metal ($ZrH_2$ was purchased from Alpha Aesar, purity 99.7%, <10 micron powder). All experimental conditions and details in this were similar to those used for zirconium metal, as described above. For comparison, FIG. 7e shows x-ray diffraction patterns for the commercial $ZrH_2$, and FIG. 7f shows x-ray diffraction pattern for commercial zirconium oxide, $ZrO_2$ (purchased from Alpha Aesar, purity 95% powder).

As in the case of titanium, a series of comparative materials were also prepared, namely: $ZrH_2$ ball milled without any additions, ball milled $ZrO_2$, a ball milled mixture of $ZrH_2$ and $ZrO_2$. All these processes were performed under identical ball milling conditions as used for the new catalyst, with the same parameters, and using the same technique of loading and handling.

As found with the titanium example, only ball milled $ZrH_2$ exhibited x-ray diffraction pattern similar to the diffraction pattern of our catalyst, and all other materials showed formation of oxide-type phases.

Catalytic properties of the Zr-based catalyst were evaluated in the process of hydrogenation of zirconium, i.e. in the process of formation of zirconium hydride. Usually, formation of zirconium hydride is performed at temperatures around 400° C., and according to "Compilation of IEA/DOE/SNL Hydride Databases" by G. Sandrock and G. Thomas http://hydpark.ca.sandia.gov, zirconium exhibits good reaction rates at these temperatures.

Figure 8:
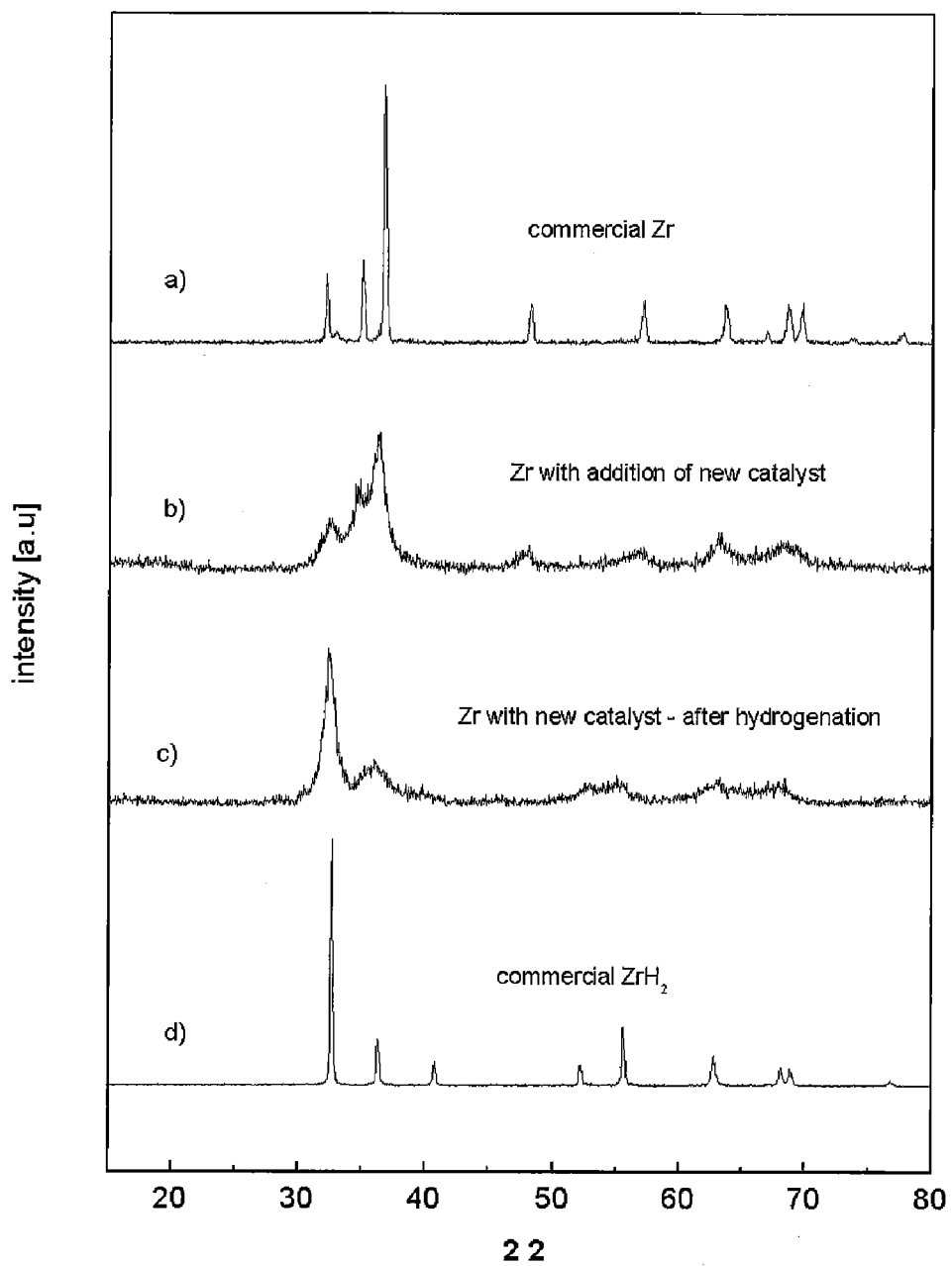
FIG. 8 illustrates x-ray diffraction patterns referred to in Example 2 of Zr/Zr-based catalyst systems and that of comparative materials, before and after hydrogenation.

In our hydrogenation experiments, zirconium powder (purchased from Alpha Aesar, with purity 95.+%, average powder size 2-3 micron), was dried as described above. Subsequently, zirconium powder was mixed with 10 wt. % of the new Zr-based catalyst (prepared from each of zirconium metal and zirconium hydride, as described above) and ball milled (in SPEX CentriPrep 8000M Mixer/Mill) for a short period of time (less than 1. hour) in order to provide good distribution of the catalyst over zirconium powder. FIG. 8a shows x-ray diffraction pattern of the starting commercial powder, and FIG. 8b presents x-ray diffraction pattern of Zr after introducing the catalyst by ball milling. Broader Bragg's reflections as compared to the starting material reflect the effects of strain, defects and nanocrystalline structure introduced by ball milling.

Figure 9:
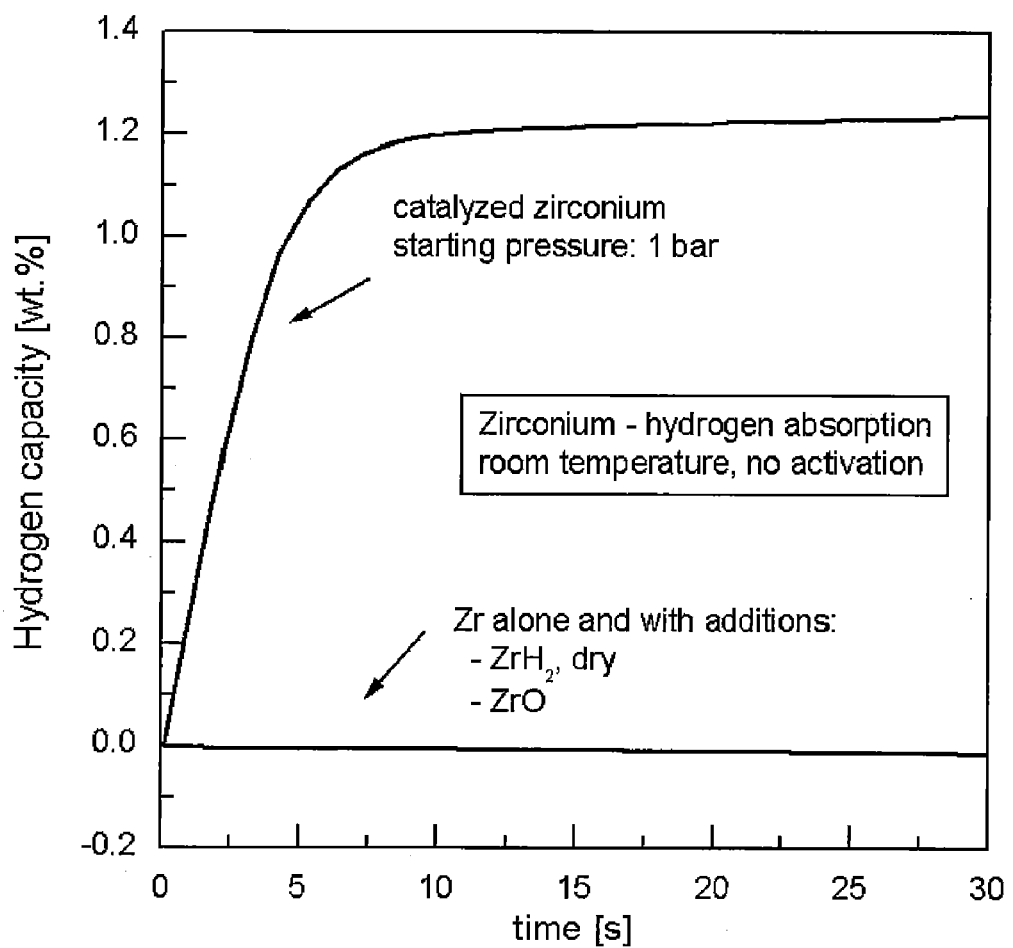
FIG. 9 illustrates hydrogen absorption referred to in Example 2 of Zr/Zr-based catalyst systems and that of comparative materials.

Hydrogen absorption of the material was measured in an automated, computer controlled gas titration system. Zirconium powder catalyzed by the new zirconium-based catalyst was transferred from the ball milling vial into the titration system holder and after evacuation of the apparatus (without any preheating or conditioning), hydrogen gas was introduced at room temperature under the pressure of about 1 bar. A very fast reaction of hydrogen absorption was immediately observed, which was substantially complete in under 10 seconds, as shown in FIG. 9.

In comparative experiments, zirconium powder without additions, and zirconium powder intermixed by short ball milling (1 hr) with additions of the before-mentioned comparative materials, were applied to the zirconium powder (i.e. dry, ball-milled $ZrH_2$, ball-milled $ZrO_2$, and their mixture), and similar hydrogenation experiments to those involving the new Zr-based catalyst were carried out. In the comparative cases, zirconium hydride was not formed within a comparable period of time, as shown in FIG. 9.

Figure 10:
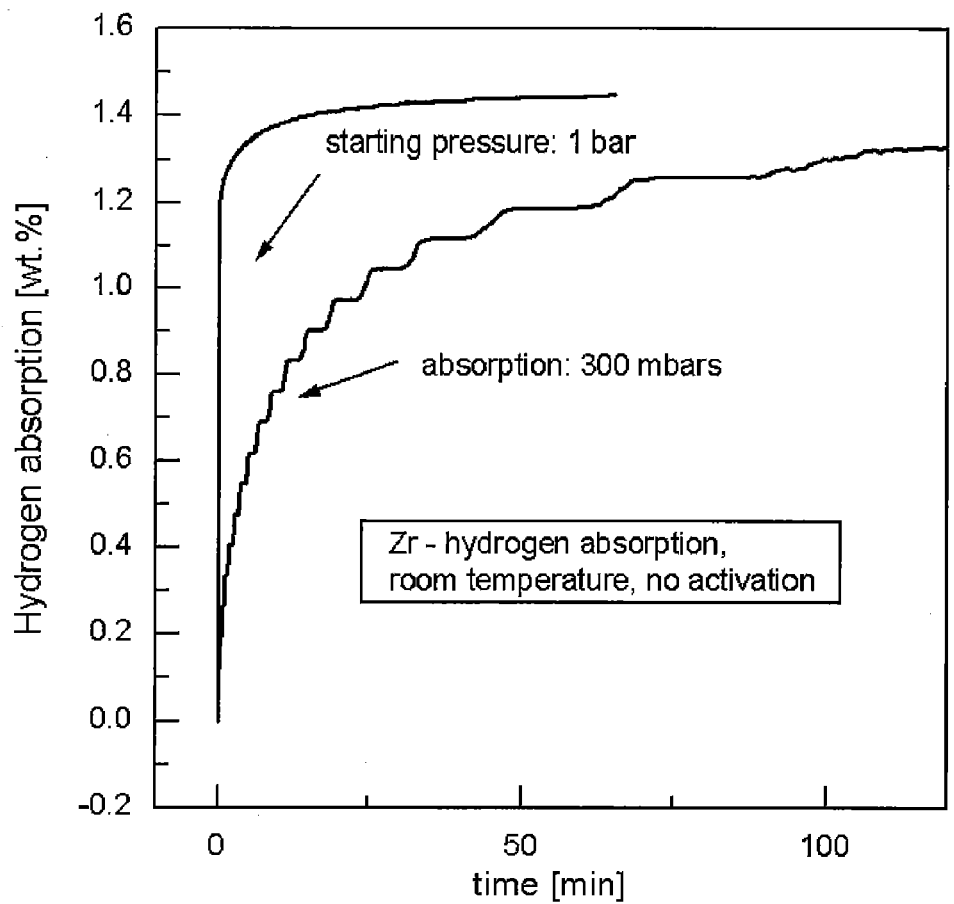
FIG. 10 illustrates hydrogen absorption referred to in Example 2 of a Zr/Zr-based catalyst system under different hydrogen pressures.

In another experiment, hydrogen pressure used for absorption (without any activation or preheating) was as low as 300 mbars, and the formation of zirconium hydride from the catalyzed zirconium occurred within less than 100 min., as shown in FIG. 10. X-ray diffraction pattern shown in FIG. 8c illustrates catalyzed Zr powder after hydrogenation, which confirms formation of zirconium hydride under the applied conditions (room temperature, no activation, hydrogen pressure between 300 mbars and 1 bar).

Example 3

Use of Metal Oxides in Catalyst Formation

The following experiments describe examples of various methods and compositions to produce new catalysts with outstanding catalytic ability. One important variation is the use of metal oxides as donors of the electronegative element. The advantage of the use of easily reducing oxides in combination with liquids (such as water and alcohol) in the ball milling process, is that the contribution of the electronegative element is in this way more easily controlled, through a "self-adjusting" mechanism of partial (or full) reduction of the oxide.

(a) Uses of Metal Oxides to Form Zr-Based Catalysts

Figure 11:
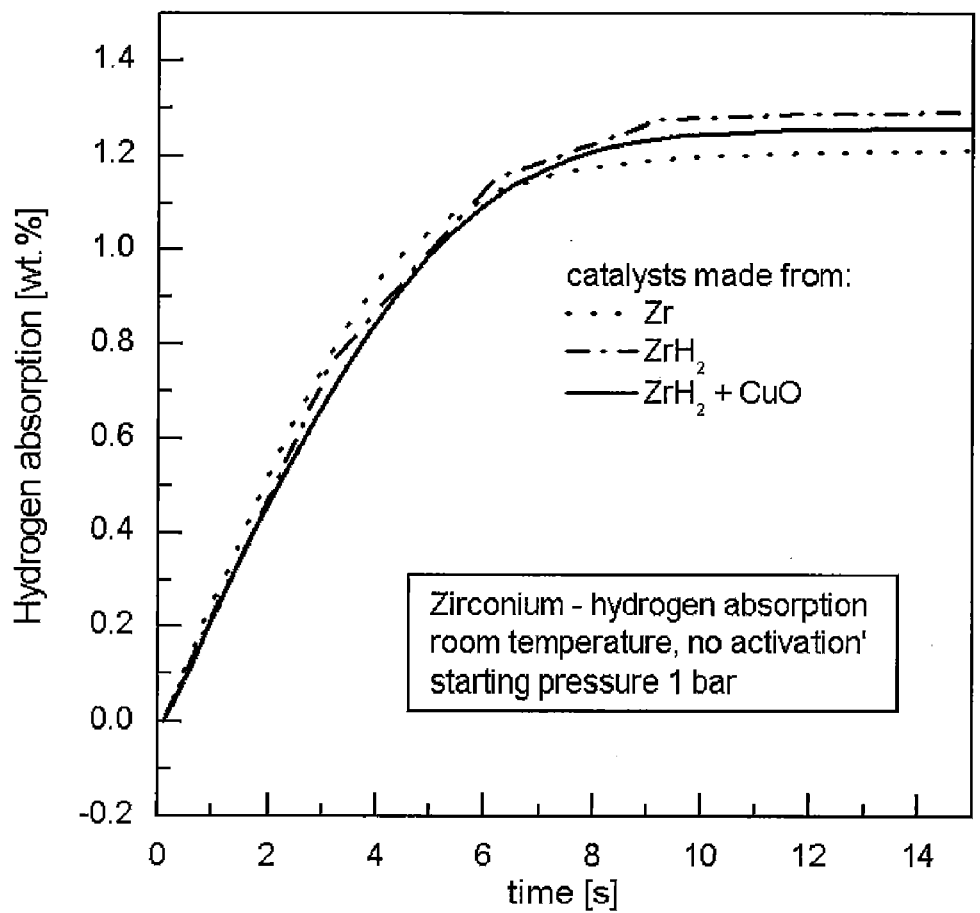
FIG. 11 illustrates hydrogen absorption referred to in Examples 2 and 3 of various Zr/Zr-based catalyst systems.
Figure 12:
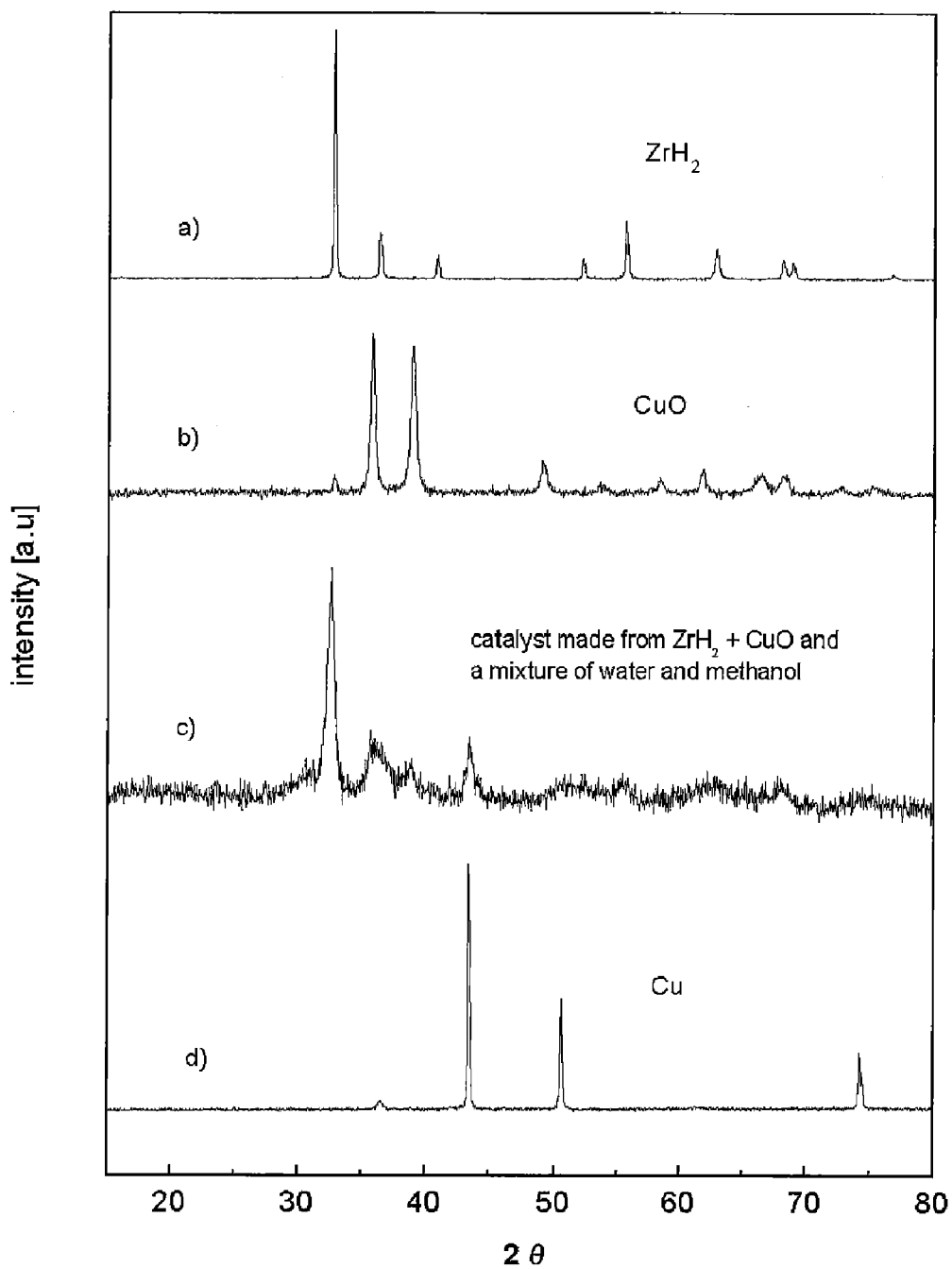
FIG. 12 illustrates x-ray diffraction patterns referred to in Example 3 of Zr/CuO based catalysts and that of comparative materials.

Another zirconium-based catalyst was produced from zirconium hydride ($ZrH_2$) and copper oxide (CuO), in a process of ball milling with a mixture of water and methanol. 400 mg of zirconium hydride $ZrH_2$ (Alpha Aesar, purity 99.7%, <10 micron powder) was placed in a stainless steel vial with 400 mg of copper oxide CuO (Alpha Aesar, purity 99.7%, −200 mesh powder) and 0.4 ml of a 1:1 molar ratio mixture of water and methanol (methyl alcohol HPLC grade 99.9%), together with stainless steel balls, giving a ball-to-powder ratio of about 20:1 on a weight basis. The loading was done in a glove box with protective argon atmosphere. Subsequently, the vial was mounted in a high-energy ball mill (SPEX CentriPrep 8000M Mixer/Mill). Ball milling was performed for 9 hours. After the process, there was no visual presence of the liquid phase, and the product was a black, fine powder, with very small reddish particles, visible under magnifying glass. X-ray diffraction pattern of this material (FIG. 12c) indicates that at least a portion of CuO was reduced during the milling process, and Bragg's reflection characteristic for metallic copper appeared in the spectrum (x-ray diffraction pattern of commercial Cu is shown in FIG. 12d for comparison). This material was subsequently used as a catalyst in the non-temperature hydrogenation reaction of zirconium, under conditions similar to those for the corresponding experiments in Example 2. FIG. 11 illustrates the hydrogenation kinetics characteristic of the Zr-based catalyst prepared, as above, from a mixture of $ZrH_2$ and CuO, and then intermixed with zirconium powder to render the system which then was hydrogenated. FIG. 11 also comparatively illustrates the hydrogenation kinetics characteristic of the Zr-based catalyst prepared from $ZrH_2$ and CuO versus Zr-based catalysts prepared from Zr and $ZrH_2$ (as per Example 2). Each catalyst appears to be substantially equally effective in improving the kinetics of the hydrogenation.

Figure 14:
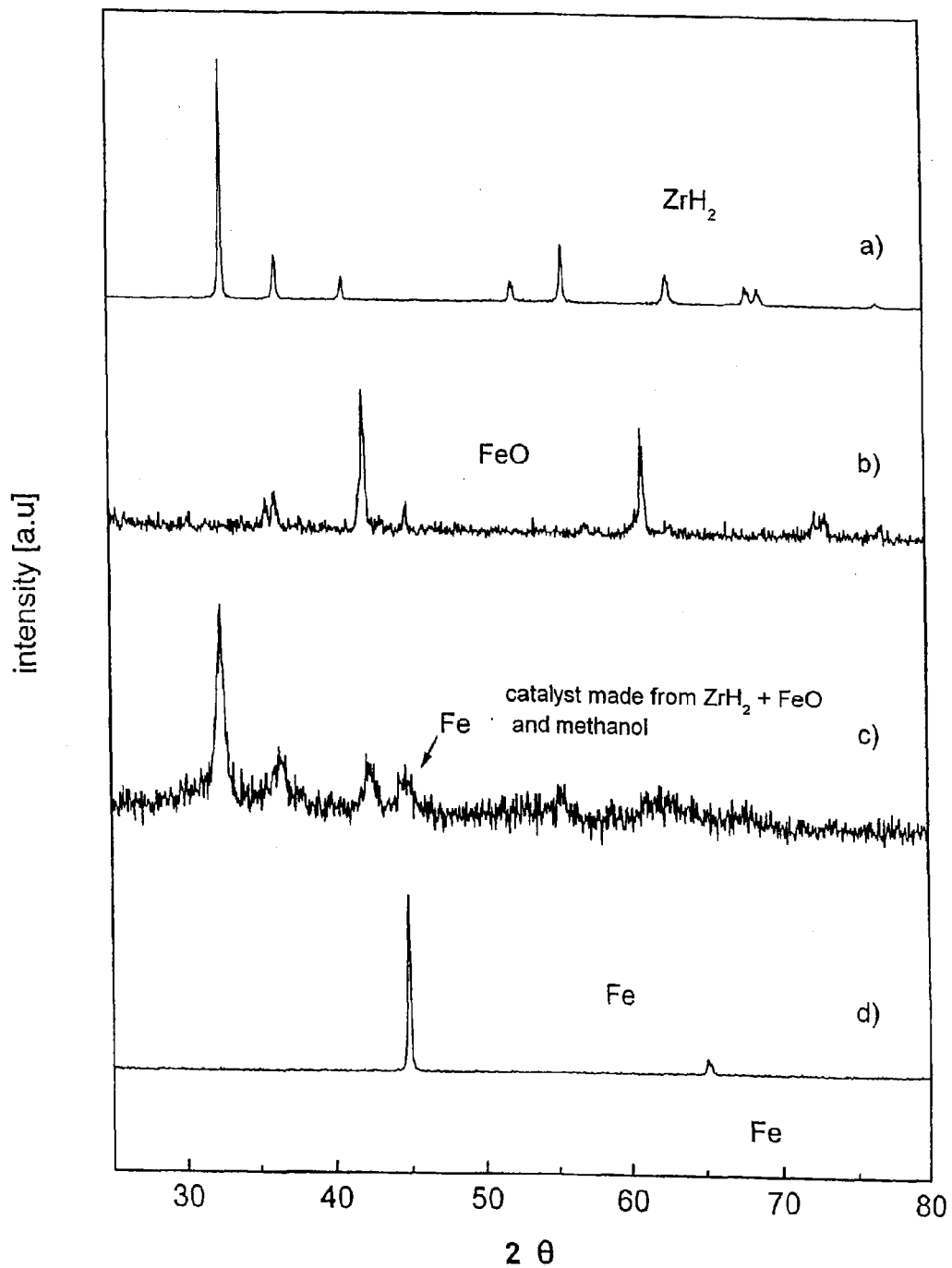
FIG. 14 illustrates x-ray diffraction patterns referred to in Example 3 of Zr/FeO based catalysts and that of comparative materials.

A further zirconium-based catalyst was produced from zirconium hydride $ZrH_2$ and iron oxide FeO, in a process of ball milling with a mixture of water and methanol. 400 mg of zirconium hydride $ZrH_2$ (Alpha Aesar, purity 99.7%, <10 micron powder) was placed in a stainless steel vial with 400 mg of iron oxide FeO (Alpha Aesar, purity 99.5%, −10 mesh powder) and 0.4 ml of a 1:1 molar ratio mixture of water and methanol (methyl alcohol HPLC grade 99.9%), together with stainless steel balls, giving a ball-to-powder ratio of about 20:1 on a weight basis. The loading was done in a glove box with protective argon atmosphere. Subsequently, the vial was mounted in a high-energy ball mill (SPEX CentriPrep 8000M Mixer/Mill). Ball milling was performed for 9 hours. After the process, there was no visual presence of the liquid phase, and the product was a black, fine powder. X-ray diffraction pattern of this material (FIG. 14c) indicates that at least a portion of FeO was reduced during the milling process, and Bragg's reflection characteristic for metallic iron appeared in the spectrum (x-ray diffraction pattern of commercial Fe is shown in FIG. 14d for comparison).

(b) Use of Metal Oxides to Form Ti-Based Catalysts

Figure 13:
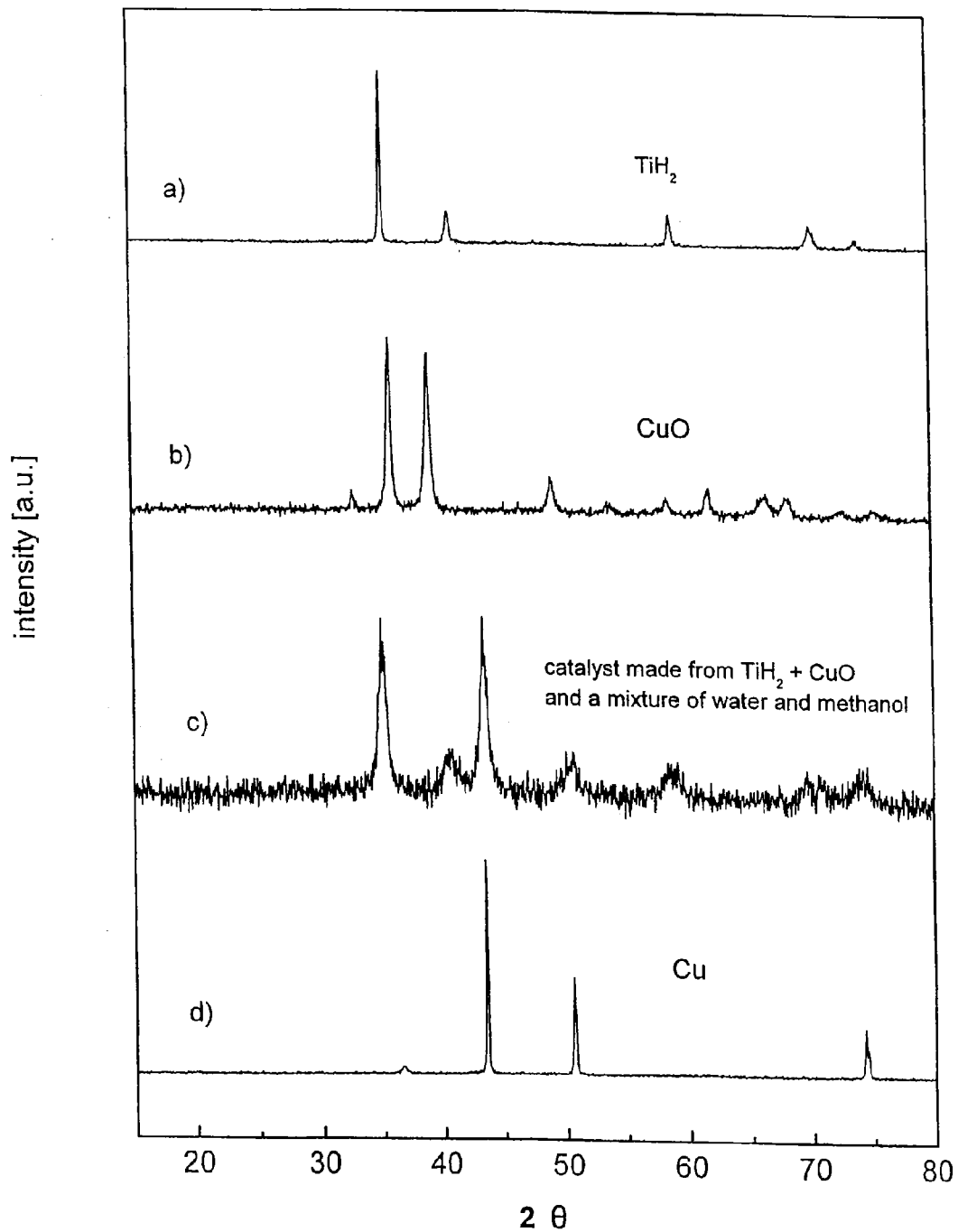
FIG. 13 illustrates x-ray diffraction patterns referred to in Example 3 of Ti/CuO based catalysts and that of comparative materials.

Titanium-based catalyst was produced from titanium hydride $TiH_2$ and copper oxide CuO, in a process of ball milling with a mixture of water and methanol, 450 mg of titanium hydride $TiH_2$ (Aldrich, purity 98%, powder −325 mesh) was placed in a stainless steel vial with 350 mg of copper oxide CuO (Alpha Aesar, purity 99.7%, −200 mesh powder) and 0.5 ml of a 1:1 molar ratio mixture of water and methanol (methyl alcohol HPLC grade 99.9%), together with stainless steel balls, giving a ball-to-powder ratio of about 20:1 on a weight basis. The loading was done in a glove box with protective argon atmosphere, Subsequently, the vial was mounted in a high-energy ball mill (SPEX CentriPrep 8000M Mixer/Mill). Ball milling was performed for 9 hours. After the process, there was no visual presence of the liquid phase, and the product was a black, fine powder, with uniformly distributed, very small reddish particles. X-ray diffraction pattern of this material (FIG. 13c) indicates that CuO was fully reduced during the milling process, and Bragg's reflection characteristic for metallic copper appeared in the spectrum (x-ray diffraction pattern of commercial Cu is shown in FIG. 13d for comparison).

Catalytic ability of this new Ti-based catalyst was evaluated in the hydrogenation of magnesium (i.e. in formation of magnesium hydride $MgH_2$). Normally, magnesium hydride is very difficult to fabricate. According to "Compilation of IEA/DOE/SNL Hydride Databases" by G. Sandrock and G. Thomas http://hydpark.ca.sandia.gov, magnesium "will slowly react with $H_2$", however kinetics "is generally very slow with difficulty in reaching 2.0 H/M (hydrogen:metal ratio). In order to activate the reaction with hydrogen, activation has to be applied, which consists of heating to 325° C. under vacuum. As stated in the Database, hydrogenation of magnesium "is sensitive to $O_2$ and $H_2O$".

Magnesium was purchased from Alpha Aesar, with 99.8% purity. As with the experiments described above, magnesium powder (with x-ray diffraction pattern shown in FIG. 18, consistent with International Centre for Diffraction Data database PDF-2, card number 89-5003) was mixed with 10 wt. % of the new catalyst (prepared from $TiH_2$ and CuO, and ball milled for a short period of time (less than 1 hour)) in order to provide good distribution of the catalyst over magnesium powder.

Hydrogen absorption capabilities of the material were measured in the automated, computer controlled gas titration system, which allows precise evaluation of hydrogen uptake and release by measuring pressure changes in a closed system.

Figure 18:
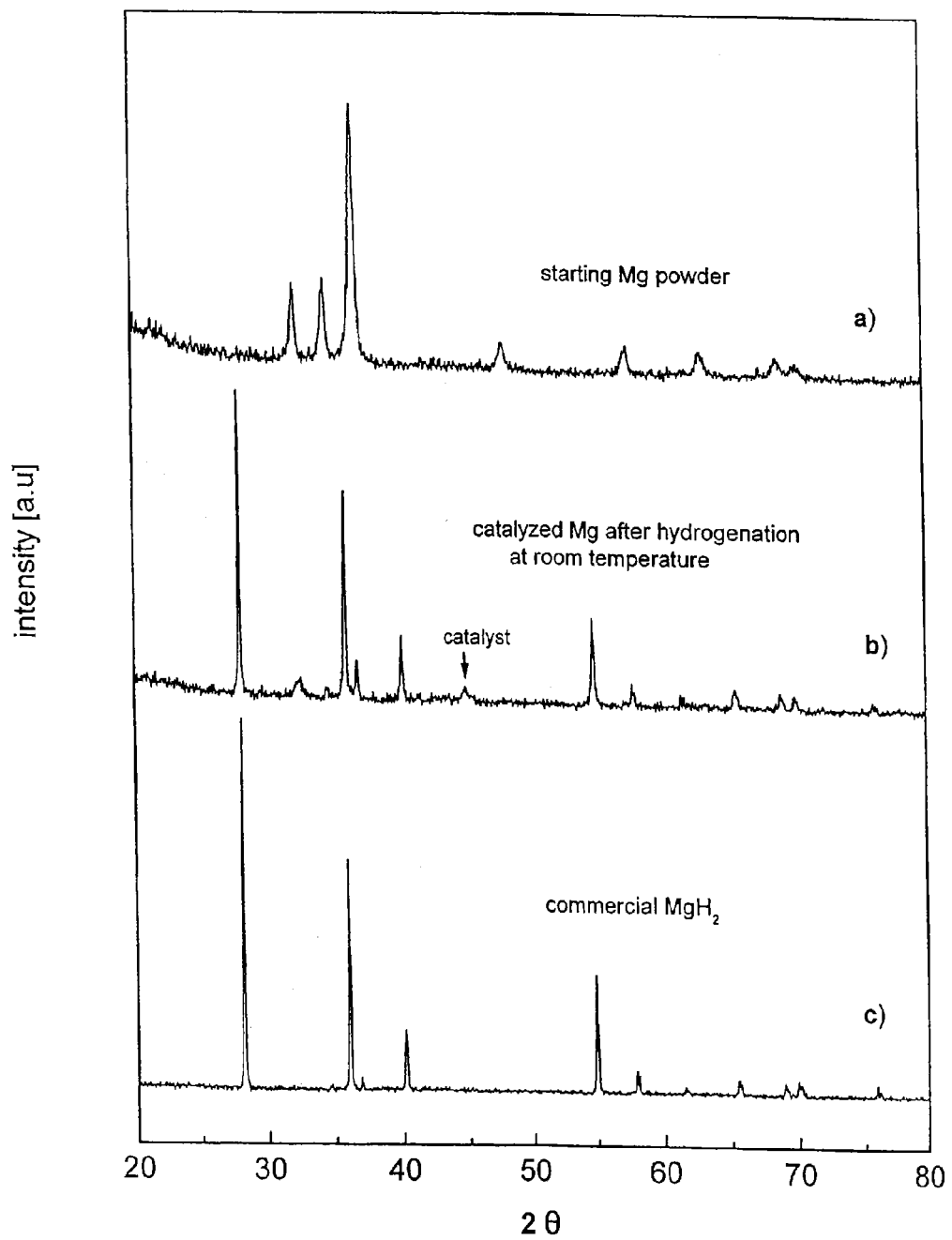
FIG. 18 illustrates x-ray diffraction patterns referred to in Example 3 of Mg-based system before and after hydrogenation.
Figure 19:
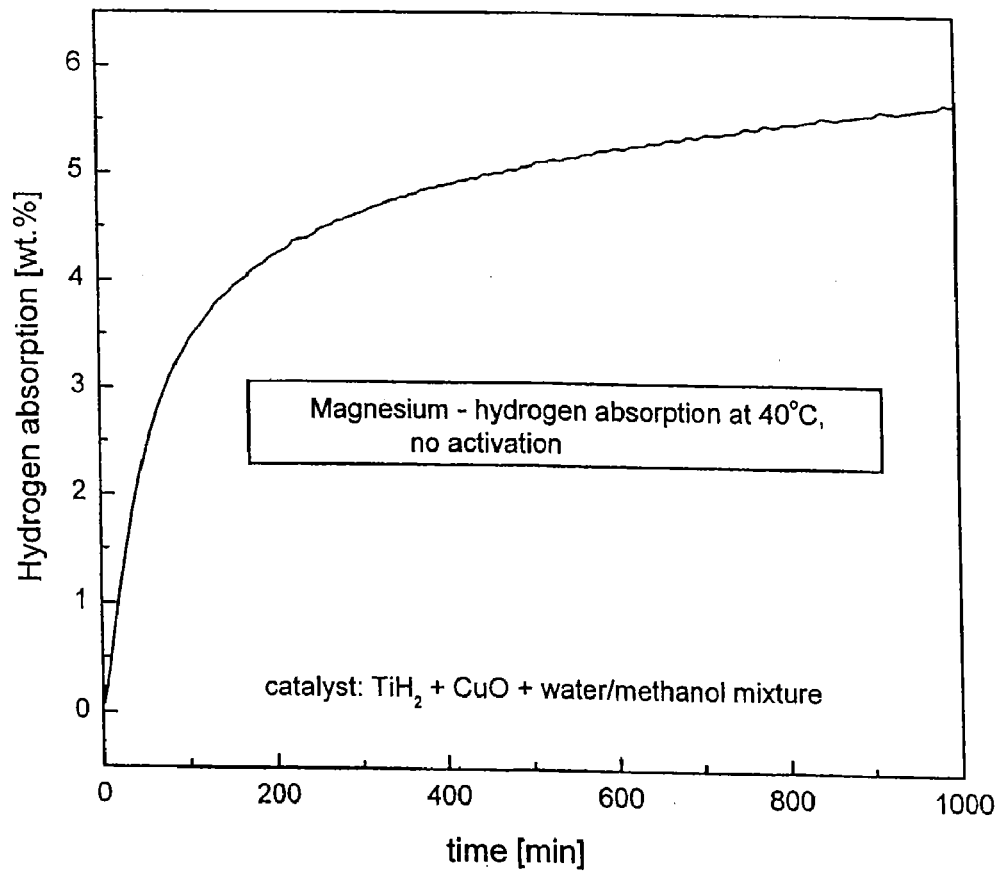
FIG. 19 illustrates hydrogen absorption referred to in Examples 3 of Mg-based system.

In contrast to conventional magnesium which requires high-temperature activation, magnesium powder catalyzed by this new Ti-based catalyst exhibited fast formation of magnesium hydride at room temperature, without any activation or preheating. FIG. 19 shows formation of magnesium hydride from the catalyzed magnesium at 40° C., without any activation or preheating. As illustrated in FIG. 18, after hydrogenation, the material exhibits x-ray diffraction pattern characteristic for $MgH_2$, consistent with the International Centre for Diffraction Data database PDF-2, card number 72-1687. As can be seen in this diffraction pattern, the presence of small amount of the catalyst is still visible after hydrogenation, which had not been consumed or significantly transformed in the hydrogenation process and remains effective in the subsequent hydrogenation/dehydrogenation cycles.

Figure 15:
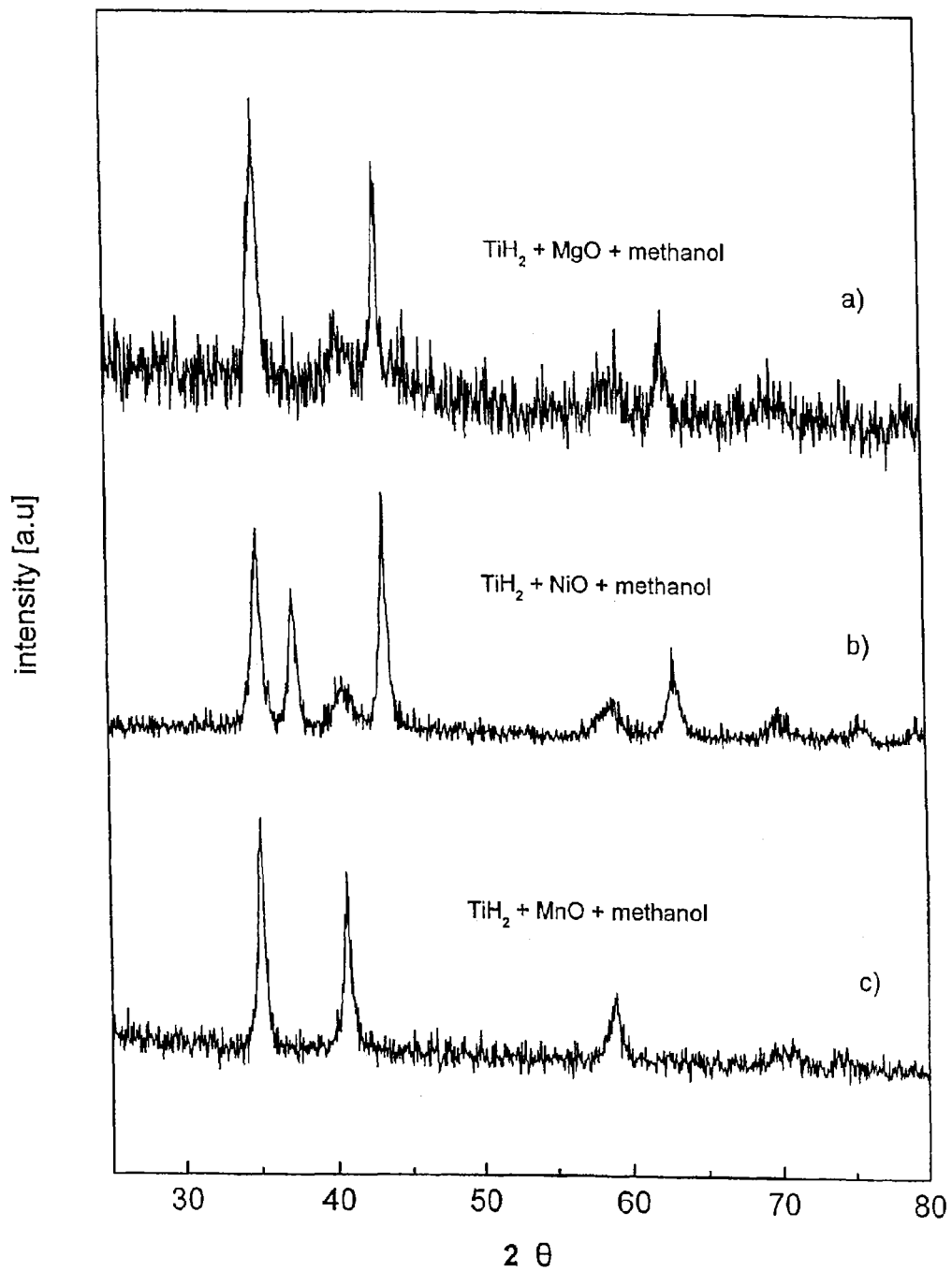
FIG. 15 illustrates x-ray diffraction patterns referred to in Example 3 of various Ti/metal oxide based catalysts.

Similar experiments have been performed to produce titanium-based catalysts with the following oxides: magnesium oxide MgO (Aldrich, purity 98%), manganese oxide MnO (Alpha Aesar, purity 99%, +200 mesh powder), nickel oxide NiO (Alpha Aesar, purity 99%, −325 mesh powder). X-ray diffraction patterns of some of these catalysts are shown in FIG. 15.

Example 4

CuO-Based Catalyst

Catalyst formation was observed in a series of experiments of ball-milling of copper oxide CuO with water, alcohol or their mixtures. Depending on the milling conditions, specifically the amount of water/alcohol added, and milling time, different stages of reduction of CuO were observed, namely various mixtures of $CuO+Cu_2O$, or $Cu_2O+Cu$, or $CuO+Cu_2O+Cu$. These materials exhibited exemplary catalytic abilities, although no obvious indication of any particular M-H coordination was seen in the diffraction patterns.

Figure 16:
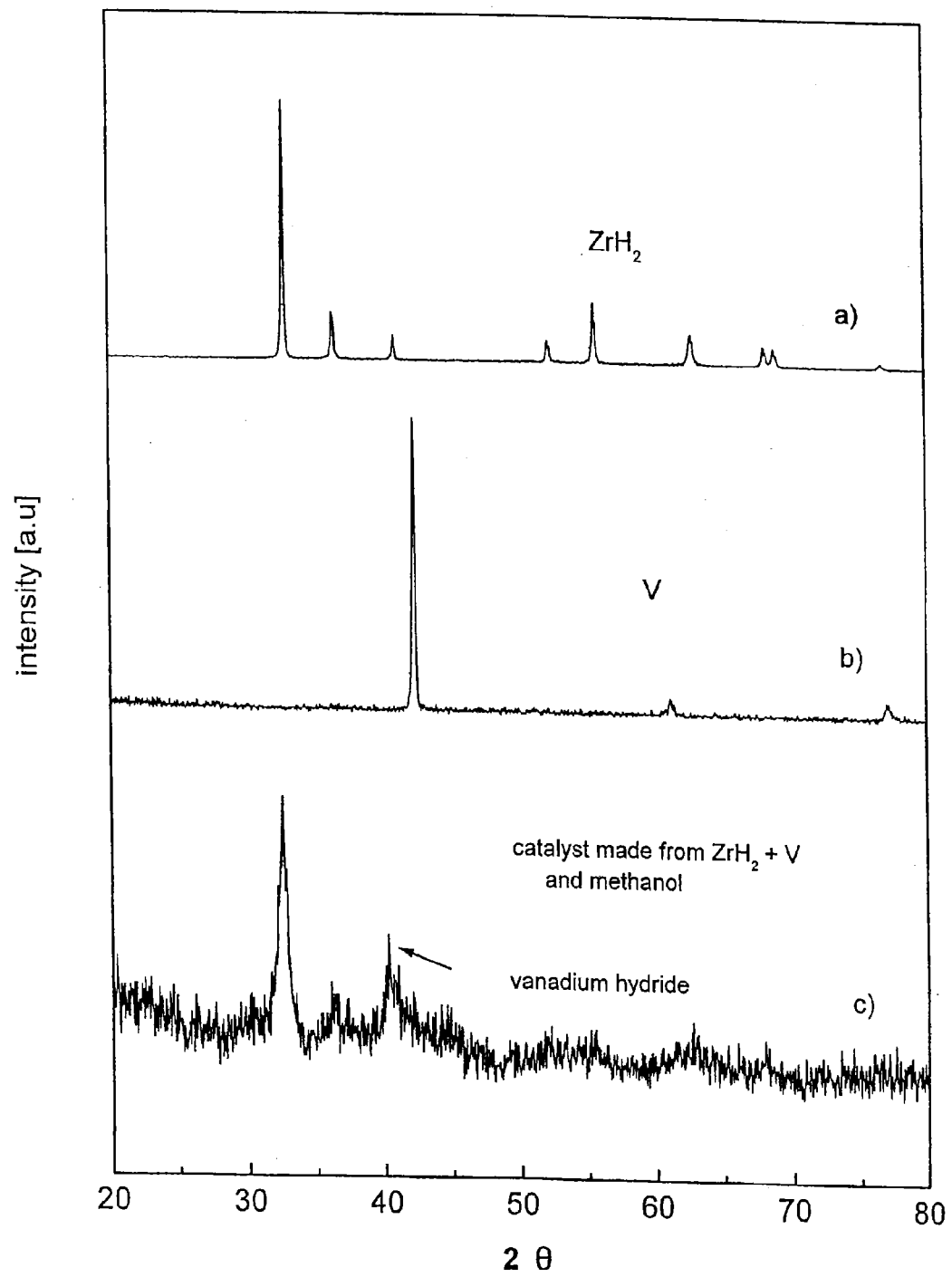
FIG. 16 illustrates x-ray diffraction patterns referred to in Example 7 of Zr/V based catalysts and that of comparative materials.

To prepare copper-based catalysts, 800 mg of copper oxide CuO (Alpha Aesar, with purity 99.7%, −200 mesh powder) was placed in a stainless steel vial together with and 0.4 ml water and stainless steel balls, giving a ball-to-powder ratio of about 20:1 on a weight basis. The loading was done in a glove box with protective argon atmosphere. Subsequently, the vial was mounted in a high-energy ball mill (SPEC CentriPrep 8000M Mixer/Mill). Ball milling was performed for 9, 16 and 24 hours. After the process, instead of the initial black powder, the materials exhibited different tones of dark-green and brownish colors, with no visual presence of the liquid phase. X-ray diffraction pattern of these powders show various mixtures of CuO, $Cu_2O$ and Cu, depending on the milling time (FIG. 16).

Example 5

Catalyzed Dehydrogenation of $LiAlH_4$

Decomposition (i.e. dehydrogenation) of $LiAlH_4$ was catalyzed by an embodiment of a catalyst composition of the present invention. This hydride is known to be very sensitive to any traces of $H_2O$ and has to be stored with great care, under protective atmosphere of dry gas (MSDS datasheet from the material supplier). Normally, $LiAlH_4$ is relatively stable, even at elevated temperatures and decomposes slowly with hydrogen release up to 5.6 wt. % when heated up to at least 140-160° C.

$LiAlH_4$ (lithium tetrahydridoaluminate) was purchased from Alpha Aesar, with purity 95+%. Two samples were prepared under similar conditions; one from $LiAlH_4$ without any addition, and the other—with a catalyst prepared from $ZrH_2$+CuO+Zn+water/methanol mixture, in analogous way as the catalysts described in previous examples). Subsequently, $LiAlH_4$ powder was mixed with 10 wt. % of the new catalyst and ball milled (in SPEX CentriPrep 8000M Mixer/Mill) for a short period of time (less than 1 hour) in order to provide good distribution of the catalyst over zirconium powder. The comparative sample of $LiAlH_4$ was also ball milled in the same way.

Figure 20:
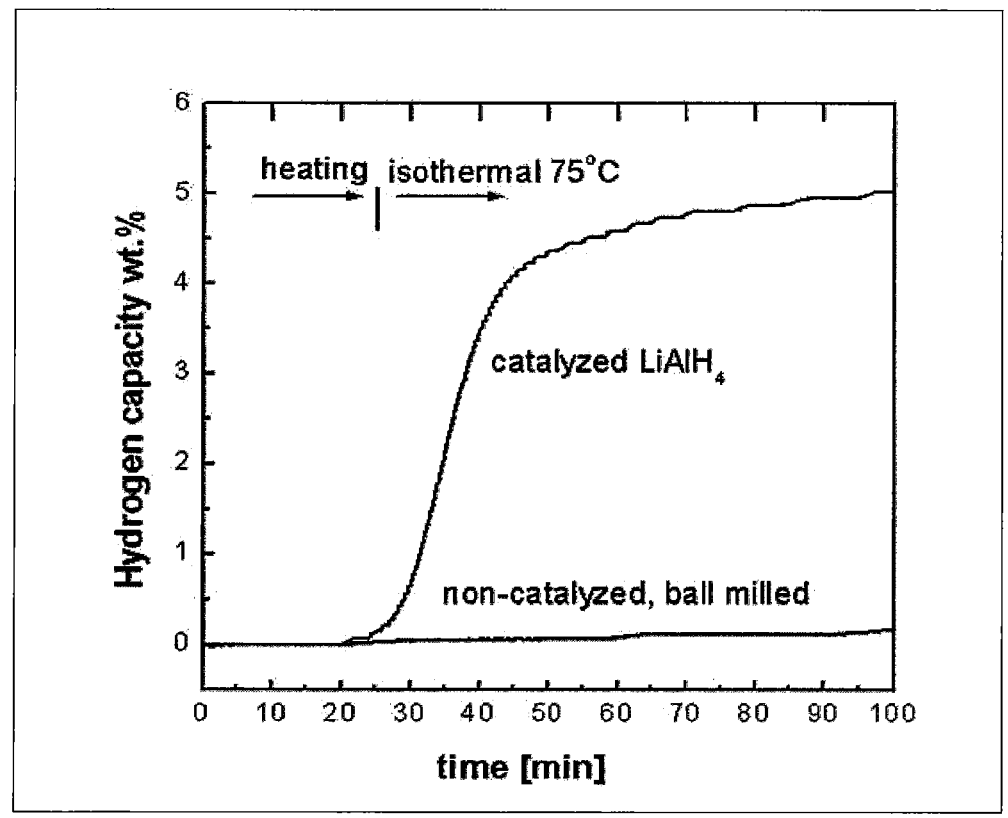
FIG. 20 illustrates hydrogen absorption referred to in Examples 5 of LiAlH4-based system.

Hydrogen desorption of the material was measured in an automated, computer controlled gas titration system. The material was transferred from the ball milling vial into the titration system holder and after evacuation of the apparatus, hydrogen gas release was measured. During the experiment, the system was heated up to 95° C., and then kept at constant temperature, while measuring hydrogen release from the sample. As seen in FIG. 20, the non-catalyzed (but ball milled) sample of $LiAlH_4$ did not show any significant hydrogen release in this temperature/time scale, but the catalyzed $LAlH_4$ exhibited fast dehydrogenation, which started at temperatures about 70-80° C. and was completed with good kinetics without exceeding 100° C. It is important to note that in this case hydrogen desorption occurs below the melting temperature of $LiAlH_4$ (125° C.), which emphasizes the efficiency of the catalyst.

Example 6

Catalyzed Hydrogenation/Dehydrogenation of $NaAlH_4$

Hydrogenation/dehydrogenation of $NaAlH_4$, (which is a sodium analog of $LiAlH_4$) was catalyzed by an embodiment of a catalyst composition of the present invention. $NaAlH_4$ has also similar sensitivity to moisture and $H_2O$ traces as $LiAlH_4$, and normally can be decomposed (dehydrogenated) only at temperatures close to its melting temperature, i.e. 180° C.

$NaAlH_4$ (sodium aluminum hydride) was purchased from Aldrich (purity 90%, dry). As in the previous example, two samples were prepared under similar conditions: one from $NaAlH_4$ without any addition, and the other—with a catalyst prepared from $TiH_2$+CuO+water/methanol mixture, in similar way as the catalysts described in previous examples). $NaAlH_4$ sample was mixed with 10 wt. % of the new catalyst and ball milled (in SPEX CentriPrep 8000M Mixer/Mill) for a short period of time (less than 1 hour) in order to provide good distribution of the catalyst. The comparative sample of $NaAlH_4$ was also ball milled in the same way.

Figure 21:
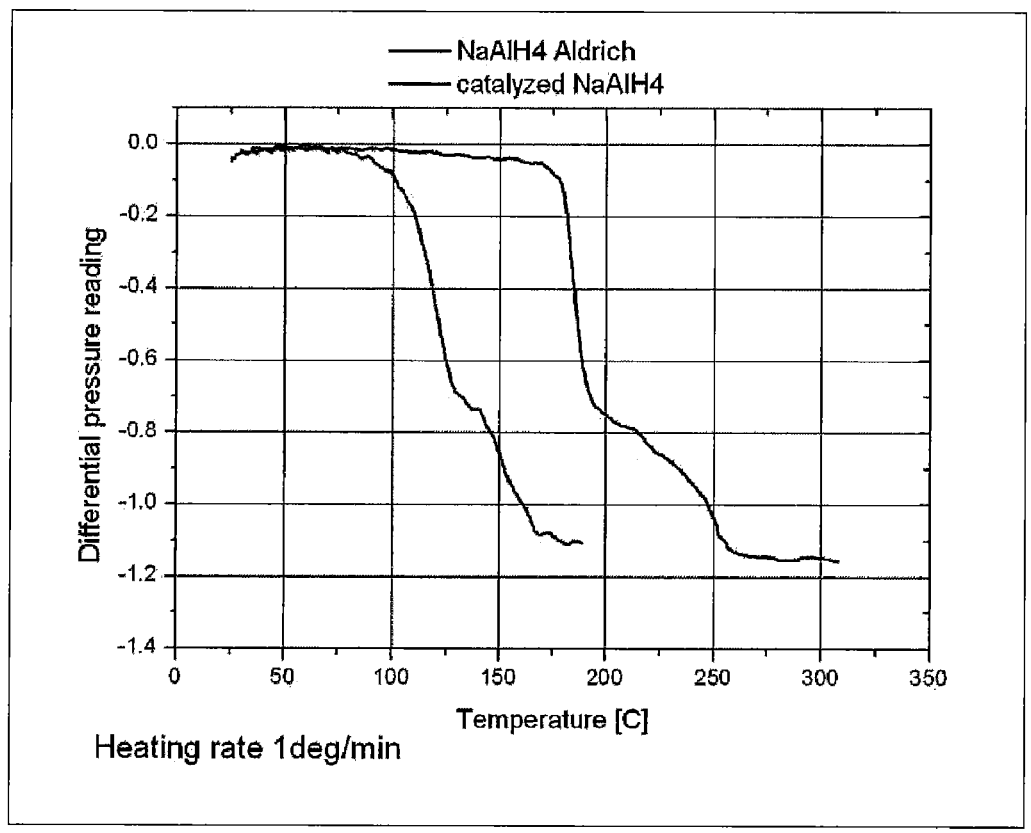
FIG. 21 illustrates hydrogen desorption referred to in Examples 6 of NaAlH4-based system.

Hydrogen desorption of these samples was measured in an automated, computer controlled gas titration system. The material was transferred from the ball milling vial into the titration system holder and after evacuation of the apparatus, hydrogen gas release was measured. During the experiment, the system was heated up to 300° C. with a constant heating rate of 1 deg/mmin., while monitoring the hydrogen release. As seen in FIG. 21, the non-catalyzed (but ball milled) sample of $NaAlH_4$ showed hydrogen release only at temperatures close to the melting temperature, i.e. around 180° C. By contrast, the catalyzed sample started desorbing hydrogen even at temperatures below 100° C.

In the subsequent hydrogenation/dehydrogenation cycles, the catalyst did not lose its catalytic ability and remained visible in the diffraction pattern in a similar way as shown in the example of hydrogenated magnesium (FIG. 18).

Figure 22:
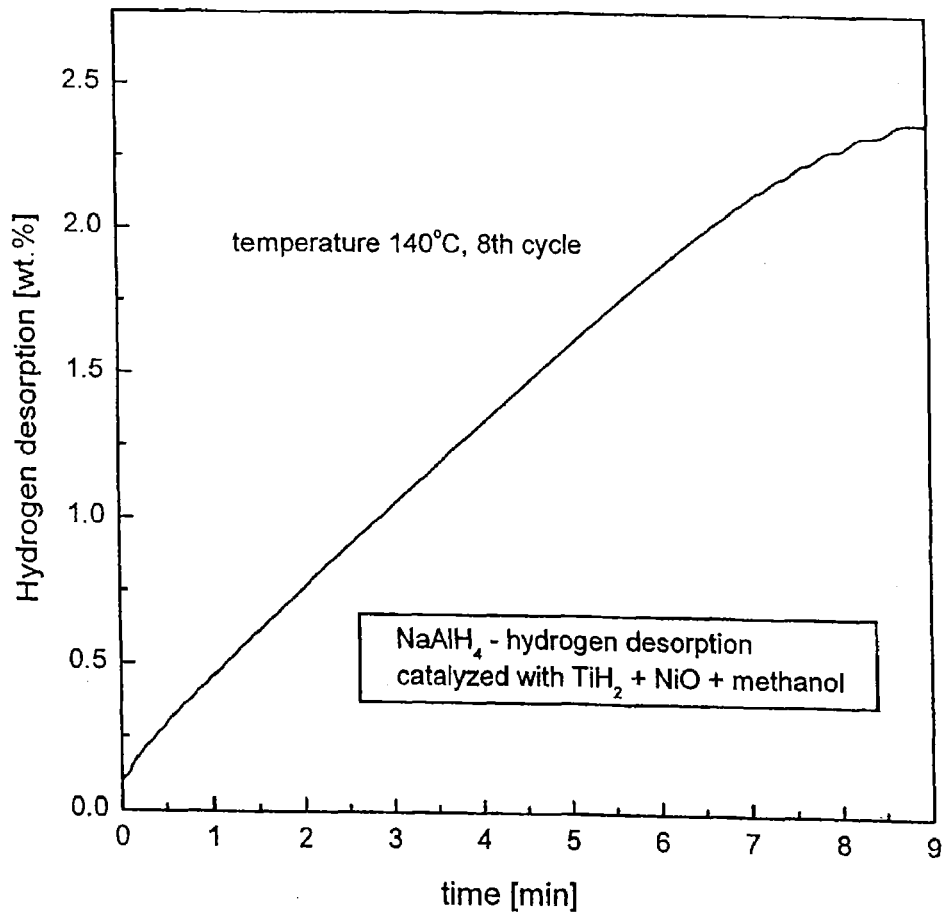
FIGS. 22 and 23 illustrate dehydrogenation kinetics referred to in Example 6 of NaAlH4-based system.
Figure 23:
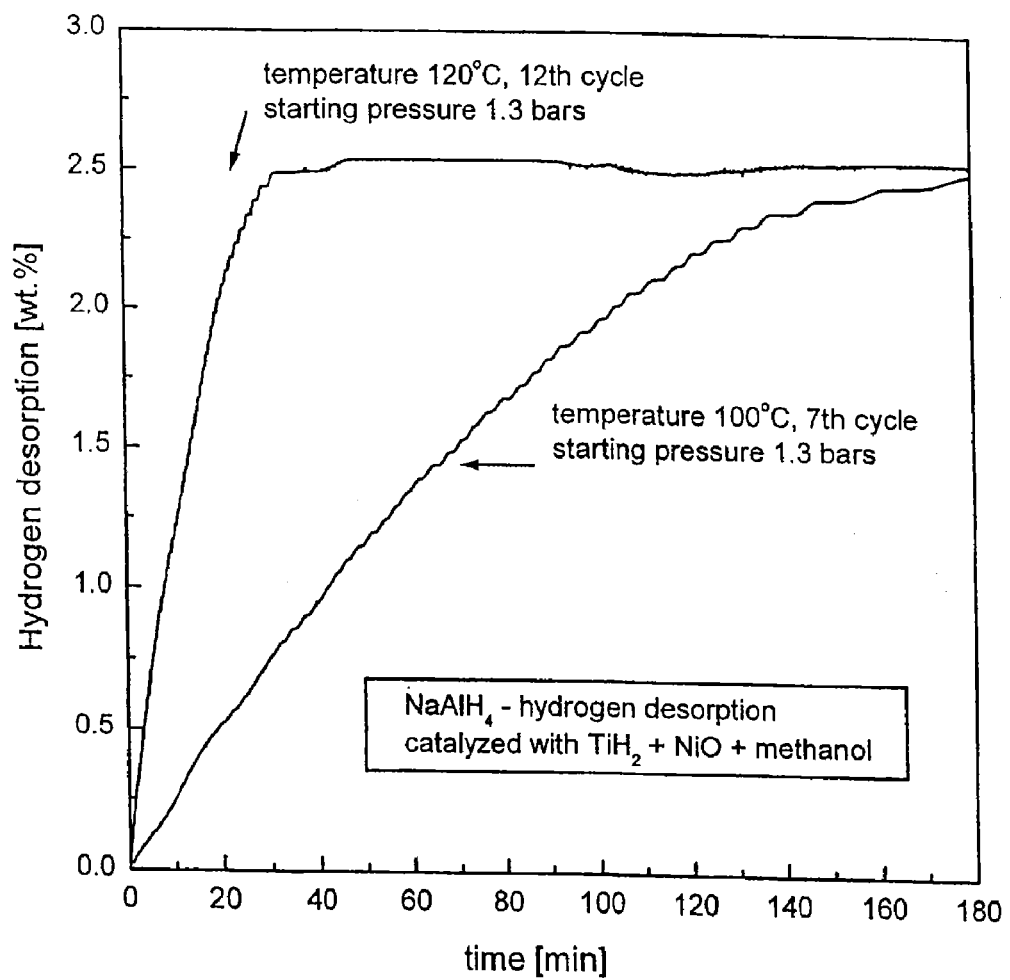
Figure 24:
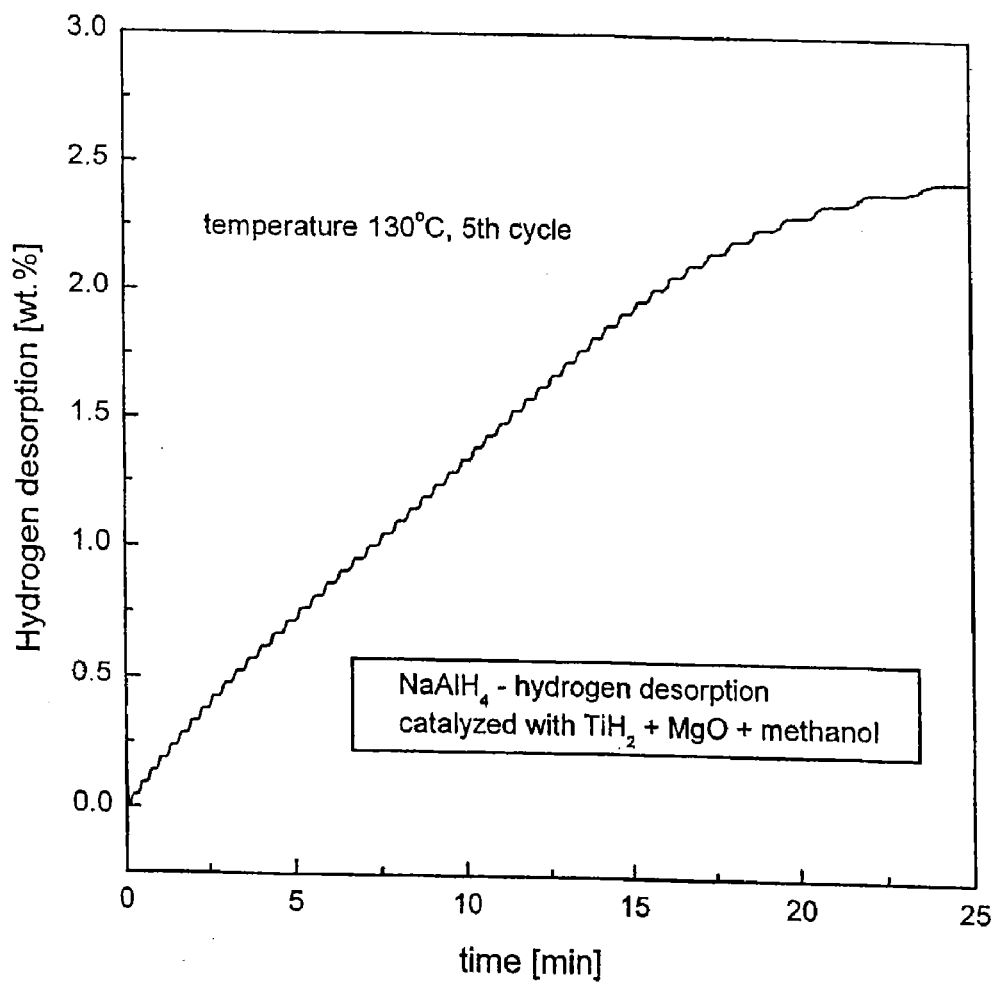
FIG. 24 illustrates hydrogen desorption referred to in Examples 6 of NaAlH4-based system.

Hydrogenation/dehydrogenation cycling was performed for similarly prepared samples of $NaAlH_4$ with a series of catalysts of the present invention, in experiments analogous to those described above. FIGS. 22 and 23 show dehydrogenation kinetics of $NaAlH_4$ catalyzed with a catalyst prepared from $TiH_2$+NiO+methanol (shown in FIG. 15*b*). Dehydrogenation was performed at various temperatures: 140, 120 and 100° C., showing unsurpassed kinetics. FIG. 24 shows hydrogen desorption from $NaAlH_4$ catalyzed by a catalyst prepared from $TiH_2$+MgO+methanol (X-ray diffraction shown in FIG. 15*c*).

Example 7

Use of Reducing Agent in Catalyst Formation

Another approach in the production of the new catalysts is to introduce reducing elements or compounds into the process of the catalyst preparation. These reducing additions, which are easily oxidized when necessary, can protect the metallic substance against oxidation. Examples of suitable additions include aluminium, magnesium, zinc, rare earth metals or carbon. In another approach, an addition is used that could act either as a reducing addition or as part of the required M-H configuration, depending on the process specifics. Such additions could be for example vanadium or manganese, which can act as protectors against oxidation for example in water-containing process, but can also form their own hydride-type configurations in ball milling with, for example, methanol.

A zirconium-based catalyst was produced from zirconium hydride ($ZrH_2$) and vanadium, in a process of ball milling with methanol, 350 mg of zirconium hydride (Alpha Aesar, purity 99.7%, powder<10 micron powder) was placed in a stainless steel vial with 450 mg of vanadium (Alpha Aesar, purity 99.5%, −20 mesh granules) and 0.5 ml methanol (methyl alcohol HPLC grade 99.9%), together with stainless steel balls, giving a ball-to-powder ratio of about 20:1 on a weight basis. The loading was done in a glove box with protective argon atmosphere. Subsequently, the vial was mounted in a high-energy ball mill (SPEX CentriPrep 8000M Mixer/Mill). Ball milling was performed for 9 hours. After the process, the resulting product was a black, fine powder. X-ray diffraction pattern of this material (FIG. 16*c*) indicates that vanadium transformed into hydride-type coordination (at least partially) during the milling process, and Bragg's reflection characteristic for vanadium hydride (according to International Centre for Diffraction Data database PDF-2, card number 891890 appeared in the spectrum).

Example 8

Catalytic Synthesis of Magnesium Hydride

Figure 25:
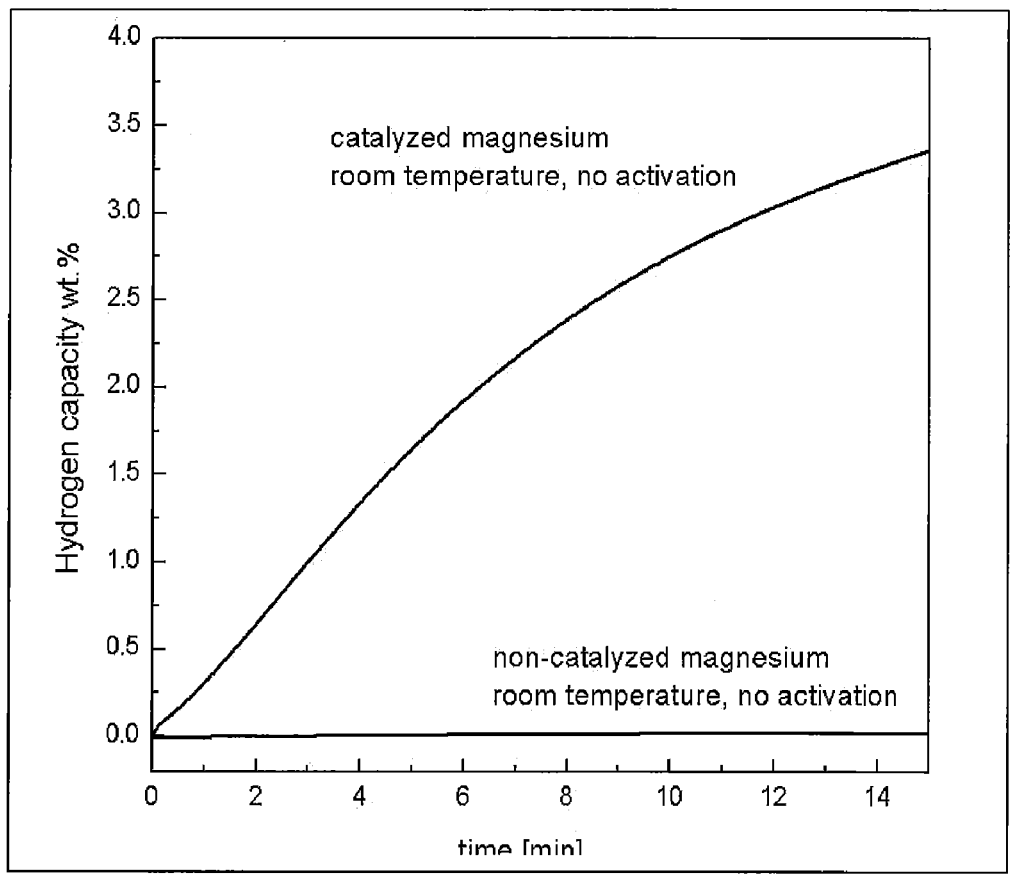
FIG. 25 illustrates the hydrogen absorption referred to in Example 8.

Magnesium powder as described in Example 3b was mixed with 10% of a Ti-based catalyst prepared from titanium hydride as described in Example 3a. In a similar way as in the Example 3a, hydrogenation of the catalyzed magnesium powder was performed in the gas titration system at room temperature (no activation was applied). The first 15 minutes of absorption (demonstrating remarkable kinetics) is shown in FIG. 25 in comparison with magnesium powder prepared in exactly the same way (i.e. the same time and conditions of ball milling), but only no catalyst was added. After the complete hydrogenation (which showed more than 6 wt. % of hydrogen capacity), the X-ray diffraction pattern of this material showed fully formed magnesium hydride, with the main catalyst peak also seen in the diffraction pattern.

Example 9

Hydrolysis of Catalyzed Magnesium Hydride

Catalyzed magnesium hydride ($MgH_2$) was synthesized as described in Example (with catalyst prepared from $TiH_2$ and CuO). Approximately 200 mg of the powder was evenly distributed on a glass plate to form a layer of about 1 mm thickness. Water (and in another experiment: water/ethanol mixture) was added drop-wise onto the plate. Upon contact of the powder with water droplets (and inside them, after inclusion of the powder into the droplets) magnesium hydride started to readily react, with liberation of significant amounts of hydrogen in the form of bubbles. In a comparative experiment, commercial magnesium hydride (in the form of powder) was substituted for the catalyzed magnesium hydride ($MgH_2$ purchased from TegoMangan with 95% purity—diffraction pattern shown in FIG. 18d). In the case of the commercial, non-catalyzed magnesium hydride, no visible hydrogen generation was observed, although the powder had similar particle size (100-150 micrometres) as the catalyzed magnesium hydride (80 micrometres).

Example 10

Hydrolysis of Second Catalyzed Magnesium Hydride

Magnesium hydride as prepared in Example 8 was also subject to a hydrolysis reaction on a glass plate. A comparative experiment was also conducted with commercial magnesium hydride on a second glass plate.

Figure 26:
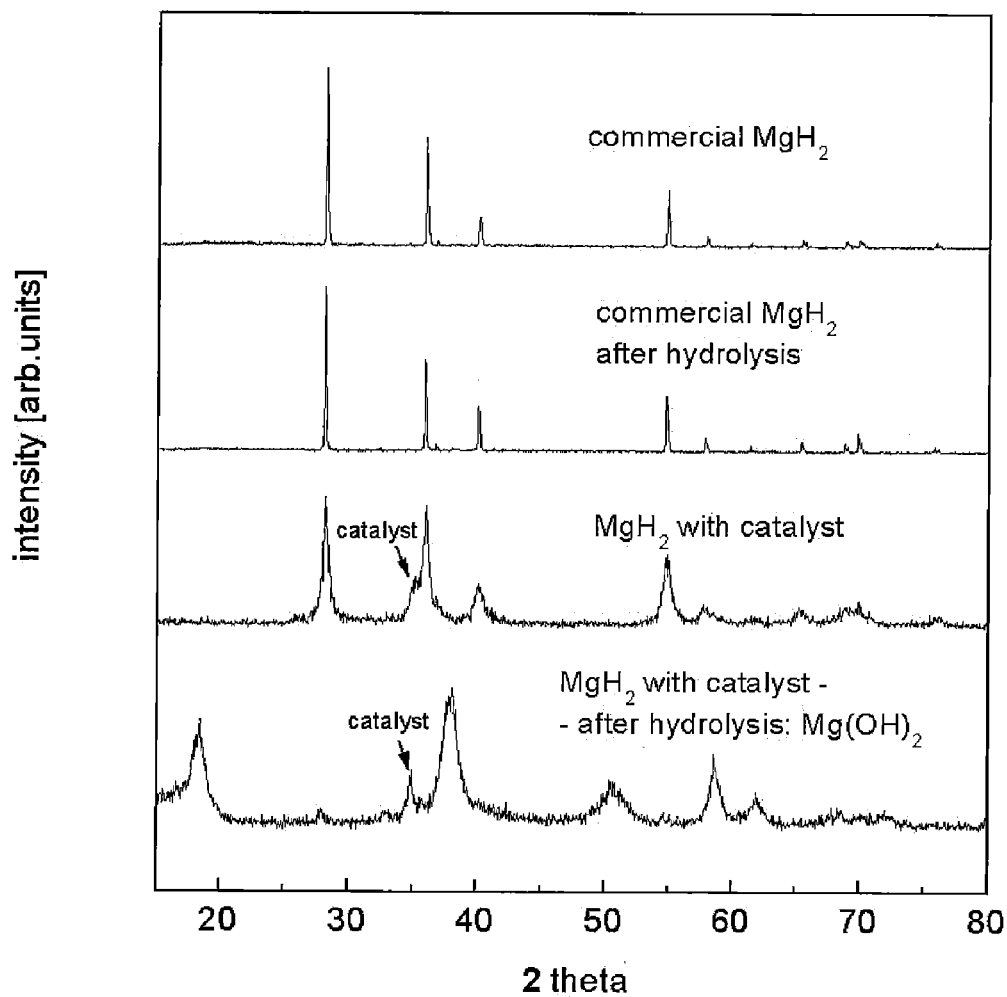
FIG. 26 illustrates the x-ray diffraction patterns referred to in Example 10.

Both plates were left overnight to dry and the dried residue was measured with X-ray diffraction. FIG. 26(b) shows that the commercial powder did not change its structure after the treatment with water, but the catalyzed magnesium hydride transformed completely. FIG. 26(c) presents the diffraction pattern of the catalyzed magnesium hydride produced as described above in Example 8. After the treatment with water the diffraction pattern in FIG. 26(d) shows that the reflections of magnesium hydride disappeared after hydrolysis, but instead—the pattern corresponded to magnesium hydroxide ($Mg(OH)_2$ card number 81-1512 in the database of International Centre for Diffraction PDF-2), which is the expected hydrolysis product (i.e. the product of the reaction of $MgH_2$ with water).

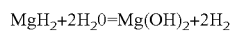

$MgH_2 + 2H_2O = Mg(OH)_2 + 2H_2$

The particle size measured by the scanning electron microscopy (SEM) showed that the catalyzed hydride had particle size up to 80 micrometers, while the commercial powder was slightly coarser and had an average particle size of about 100-150 micrometers.

Interestingly, the catalyst is still present in the diffraction pattern after hydrolysis, indicating that it remained unchanged and active in both reactions: hydrogenation of magnesium (previous process) and also hydrolysis.

Example 11

Hydrolysis of Sodium Borohydride

Figure 27:
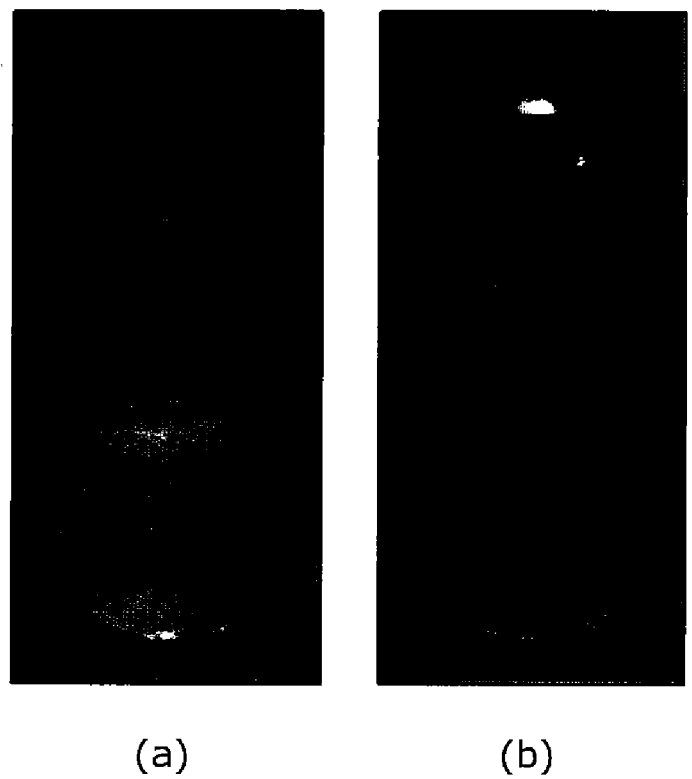
FIG. 27 are photographs of compositions referred to in Example 11.
Figure 28:
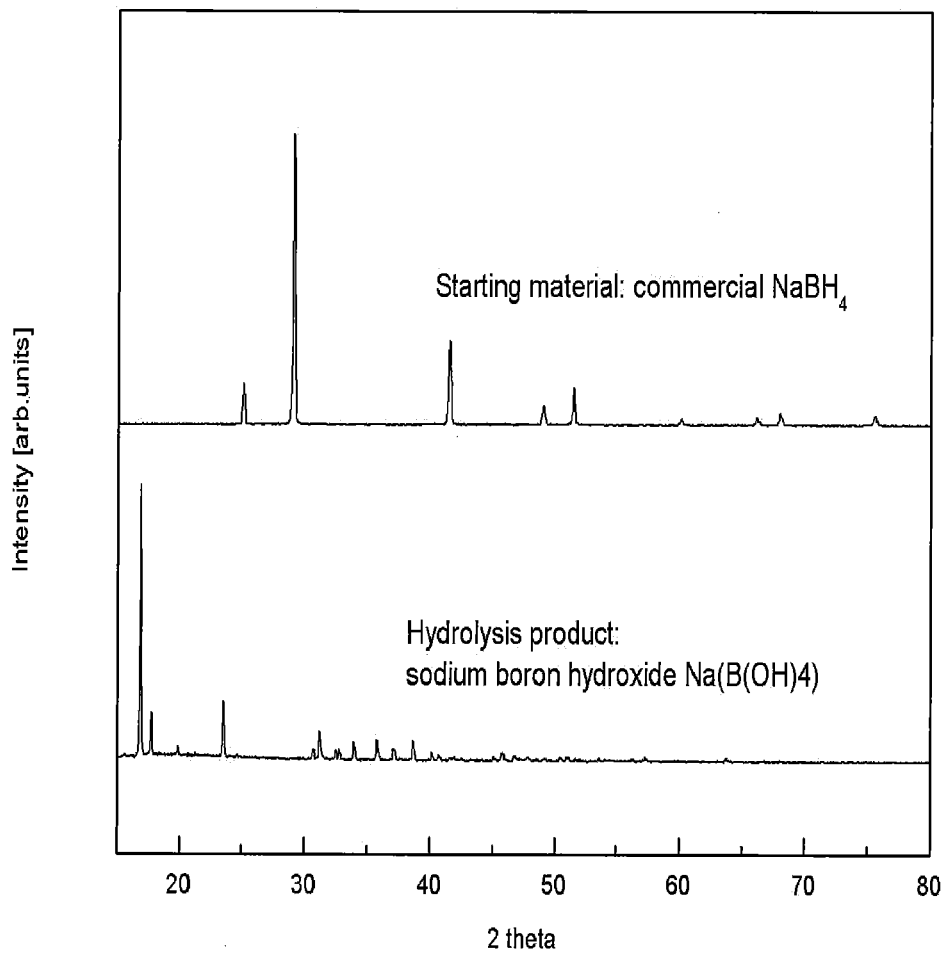
FIG. 28 illustrates the x-ray diffraction patterns referred to in Example 11.

Sodium borohydride ($NaBH_4$) was purchased from Alpha Aesar with purity of 98 wt. %. An aqueous solution of the borohydride was prepared by mixing 0.4 g of $NaBH_4$ with 1 ml of deionized water. The hydride formed a clear, relatively transparent solution in water. During about ten minutes after formation of the solution, some degree of formation of small hydrogen bubbles was observed. By contrast, adding to the solution approximately 5 mg of the copper-based catalyst (prepared as in Example 4, but with 0.6 ml methanol [methyl alcohol HPLC 99.9% (ACROS)] instead of water, caused very vigorous hydrogen generation proceeding finally up to the point when the solution was not liquid any more. FIG. 27 shows photographs of two vials: one with the aqueous solution of the borohydride (FIG. 27(a)) and the second with the same solution, but after adding the catalyst (FIG. 27(b)), which immediately caused rapid hydrogen generation. X-ray diffraction patterns of the residues formed after the hydrogen generation was completed confirmed that the hydrolysis reaction proceeded completely, with substantially no sodium borohydride left in the residual powder, as shown in FIG. 28. The diffraction pattern of the solid residues corresponds to the monoclinic structure of Na(B(OH)4) (solid boron hydroxide, card number 81-1512 in the database of International Centre for Diffraction PDF-2).

Figure 17:
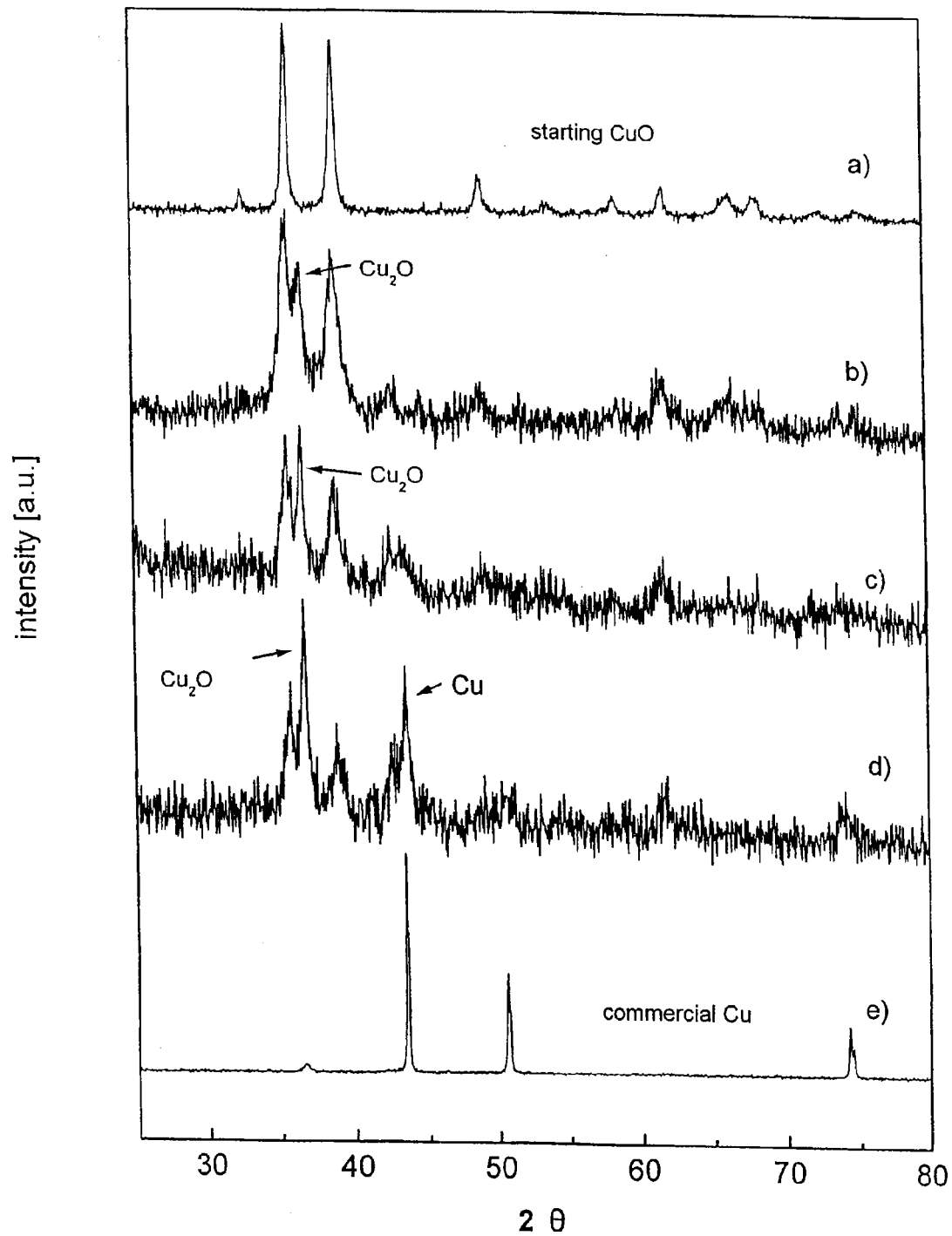
FIG. 17 illustrates x-ray diffraction patterns referred to in Example 4 of CuO based catalysts and that of comparative materials.

In another experiment, a different approach was applied. The powder of sodium borohydride (as described above) was mixed by hand with a catalyst described in Example 4 (copper-based catalyst made from CuO and water, x-ray diffraction pattern in FIG. 17b), in the proportion of 5 wt. % of the catalyst added to $NaBH_4$. Three vials were prepared, each with approximately 100 mg of this powder mixture, and, additionally, one vial with 100 mg of the sodium borohydride alone. As with the previous experiment, adding 0.7 ml of water with a syringe to the pure sodium borohydride did not cause any significant generation of hydrogen. However, adding 1 ml of water to the mixture of $NaBH_4$ (mixed with the catalyst) caused a vigorous reaction, with instant liberation of large amounts of hydrogen. In the second vial, a 1 ml mixture of water and alcohol (50%-50% by volume of water and methyl alcohol HPLC 99.9% (ACROS)) was used instead of water alone, and hydrogen generation was even faster. When 1 ml of methanol was used as a reagent with the catalyzed sodium borohydride, the reaction was extremely vigorous, and the liquid was consumed within several minutes.

Example 12

Catalytic Synthesis of $NaAlH_4$

Sodium alanate $NaAlH_4$ can be synthesized in a direct way, namely through exposing a mixture of sodium (or sodium hydride) and aluminum to high pressure of hydrogen. However, the reaction without catalysis is extremely slow, and requires high pressures and temperatures to proceed. In comparative experiments without any catalyst, the hydrogen pressure of 100 bars was not sufficient to even initiate the reaction between sodium hydride and aluminum. Therefore, the most critical factor in the synthesis of $NaAlH_4$ is an efficient catalyst.

First stage of the experiment was preparation of a Ti-based catalyst (based on $TiH_2$ powder), as described in Example 1.

470 mg of sodium hydride (NaH—purchased from Alpha Aesar, with 95 wt. % purity) was loaded into a stainless steel via together with 530 mg of aluminum powder (purchased from Alha Aesar, 99.5 wt % purity) and 90 mg of the catalyst, as fabricated in Example 1. Stainless steel balls were added giving a ball to powder ratio of about 10:1 on a weight basis. The loading was done in a glove box with a protective argon atmosphere (less than 1 ppm of oxygen and less than 1 ppm of water). The vial was mounted in a high-energy ball mill (SPEX CentriPrep 8000M Mixer/Mill). Ball milling was performed for 5 hours.

Figure 29:
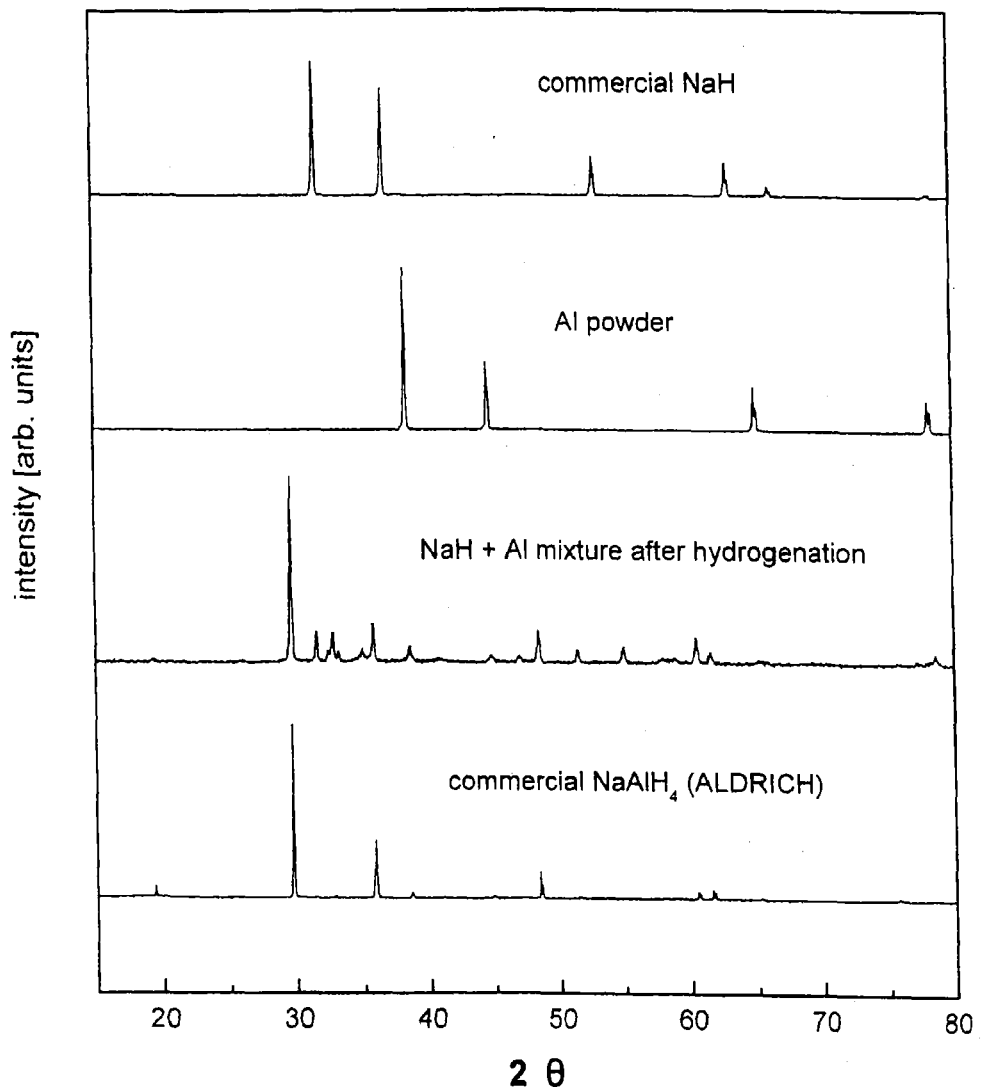
FIG. 29 illustrates the x-ray diffraction patterns referred to in Example 12.

Subsequent synthesis of $NaAlH_4$ was performed in an automated, computer-controlled gas titration system. After loading the powder to the sample holder of the instrument, the sample was thoroughly evacuated and the holder was heated up to the temperature of 125° C. Hydrogen pressure of 87 bars was applied. After about 80 minutes the sample was taken out of the system and was measured in the x-ray diffractometer. The diffraction pattern exhibited by the crystallographic structure of the produced sodium alanate (see FIG. 29(*c*)) similar to the commercially synthesized hydride, which diffraction pattern is shown in FIG. 29(*d*), which proves successful synthesis of the sodium alanate. Although $NaAlH_4$ is the dominant phase in the powder, some residual presence of another alanate, $Na_3AlH_6$, can be also seen as small, additional peaks in the pattern.

Example 13

Catalytic Synthesis of Niobium Hydride

Niobium hydride was prepared in a similar way as zirconium hydride and titanium hydride. In this case, a niobium-based catalyst was first fabricated, by ball milling of niobium hydride (500 mg+0.3 ml of methanol). Stainless steel balls were added giving a ball to powder ratio of about 20:1. The loading was done in a glove box with a protective argon atmosphere (less than 1 ppm of oxygen and less than 1 ppm of water). The vial was mounted in a high energy ball mill (SPEX CentriPrep 8000M Mixer/Mill). Ball milling was performed for 5 hours. Source of niobium hydride was Alpha Aesar with 99% purity.

Subsequently, 1 g of niobium was intermixed with 100 mg of the niobium-based catalyst. The niobium powder (niobium purchased from Alpha Aesar with purity of 99.8 wt. %) with niobium-based catalyst was exposed to hydrogen in a gas titration system under the pressure of 1 bar and at room temperature. Even without any activation of preheating, absorption of hydrogen started immediately. X-ray diffraction of the resulting powder proved that niobium hydride was formed during this experiment.

It will be understood, of course, that modifications can be made to the embodiments of the invention described herein without departing from the scope and the purview of the invention as defined by the appended claims.

The invention claimed is:

1. A composition of matter having an atomic co-ordination characterized by the following structural formula:

M-H-E, wherein:
M is selected from the group consisting of a metal, a metalloid, an alloy of a metal, an alloy of a metalloid, a compound of a metal and a compound of a metalloid;
H is hydrogen;
E is an electronegative element; and
hydrogen bonding exists between one of (a) H and E, and (b) M and H; and wherein the composition is prepared in accordance with a method comprising:
(a) combining M with a source of H, to form a first intermediate;
(b) milling the first intermediate in a high energy ball mill under an inert oxygen-free atmosphere to effect a reaction between M and H to form a second intermediate;
(c) combining the second intermediate with a source of E, to form a third intermediate, wherein the molar ratio of E to M is less than 1:1; and
(d) milling the third intermediate in a high energy ball mill under an inert reducing agent-free atmosphere to effect a reaction between the second intermediate and E.

2. The composition of matter of claim 1, having an atomic co-ordination characterized by the following structural formula:

(M+M1)-H-E, wherein:
M1 is different from M and selected from the group consisting of a metal, a metalloid, an alloy of a metal, an alloy of a metalloid, a compound of a metal and a compound of a metalloid.

3. The composition of matter of claim 1, wherein M comprises a first combination of at least two members selected from the group consisting of a metal, a metalloid, an alloy of a metal, an alloy of a metalloid, a compound of a metal and a compound of a metalloid.

4. The composition of matter of claim 3, wherein the first combination is homogeneous.

5. The composition of matter of claim 3, wherein the first combination is inhomogeneous.

6. The composition of matter of claim 2, wherein M1 comprises a second combination of at least two members selected from the group consisting of a metal, a metalloid, an alloy of a metal, an alloy of a metalloid, a compound of a metal and a compound of a metalloid.

7. The composition of matter of claim 6, wherein the second combination is homogeneous.

8. The composition of matter of claim 6, wherein the second combination is inhomogeneous.

9. The composition of matter of claim 1, wherein M is selected from the group consisting of Li, Na, K, Be, Mg, Ca, Y, Sc, Ti, Zr, Hf, V, Nb, Ta, Pt, Pd, Ru, Rh, Ge, Ga, In, La, Ce, Pr, Nd, Dy, Al, Si, and B.

10. The composition of matter of claim 1, wherein M comprises Ti.

11. The composition of matter of claim 1, wherein M comprises Zr.

12. The composition of matter of claim 2, wherein M1 is selected from the group consisting of Cr, Mo, W, Mn, Fe, Co, Ir, Ni, Cu, Ag, Au, Zn, Sn, Pb, Sb, and Bi.

13. The composition of matter of claim 2, wherein M1 comprises Cu.

14. The composition of matter of claim 1, wherein E is selected from the group comprising O, F, N, Cl, S, P, C, Te, I and Br.

15. The composition of matter of claim 14, wherein a source of E comprises a compound selected from the group consisting of oxides, nitrides, halides, sulphides, tellurides and phosphides of E.

16. The composition of matter of claim 14, wherein a source of E is selected from the group consisting of CO and NO.

17. The composition of matter of claim 14, wherein a source of E comprises a compound coordinated with at least one hydrogen atom.

18. The composition of matter of claim 17, wherein said compound coordinated with at least one hydrogen atom is selected from the group consisting of water, hydroxides, phenols, alcohols, salts, acids, alkoxides, thiols, organic acids, salts of organic acids, acid amides, amines, acid halides, alkyl halides, sulphones and organometallics.

19. The composition of matter of claim 1, in particulate form.

20. The composition of matter of claim 19, wherein said particulate form comprises particles having a size less than 100 microns.

21. The composition of matter of claim 19, wherein said particulate form comprises 80% particles having a size less than 50 microns.

22. The composition of matter of claim 19, wherein said particulate form comprises particles having a grain size less than 100 nm.

23. A hydrogen storage composition comprising:
a metallic substance selected from the group consisting of:
(a) a hydride of one of:
(i) a member of the group consisting of a metal, a metalloid, an alloy of a metal, an alloy of a metalloid, a compound of a metal and a compound of a metalloid; and
(ii) a homogeneous or inhomogeneous combination of at least two members of the group consisting of a metal, a metalloid, an alloy of a metal, an alloy of a metalloid, a compound of a metal and a compound of a metalloid; and
(b) a material capable of absorbing hydrogen to form a hydride selected from the group consisting of:
(i) a member of the group consisting of a metal, a metalloid, an alloy of a metal, an alloy of a metalloid, a compound of a metal and a compound of a metalloid; and
(ii) a homogeneous or inhomogeneous combination of at least two members of the group consisting of a metal, a metalloid, an alloy of a metal, an alloy of a metalloid, a compound of a metal and a compound of a metalloid; and
the composition of matter of claim 1.

24. The hydrogen storage composition of claim 23, wherein the metallic substance comprises a metal hydride.

25. The hydrogen storage composition of claim 24, wherein the metal hydride is selected from the group consisting of vanadium hydrides, titanium hydrides and hydrides of vanadium-titanium alloys.

26. The hydrogen storage composition of claim 24, wherein the metal hydride comprises magnesium hydride.

27. The hydrogen storage composition of claim 23, wherein the metal hydride is selected from the group comprising sodium hydride and lithium hydride.

28. The hydrogen storage composition of claim 23, wherein the metallic substance comprises a metal capable of absorbing hydrogen to form a hydride.

* * * * *

UNITED STATES PATENT AND TRADEMARK OFFICE
CERTIFICATE OF CORRECTION

PATENT NO. : 7,811,957 B2  Page 1 of 1
APPLICATION NO. : 10/746742
DATED : October 12, 2010
INVENTOR(S) : Alicja Zaluska et al.

It is certified that error appears in the above-identified patent and that said Letters Patent is hereby corrected as shown below:

Sheet 27 of 29 of the Drawings, Figure 27 should appear as follows:

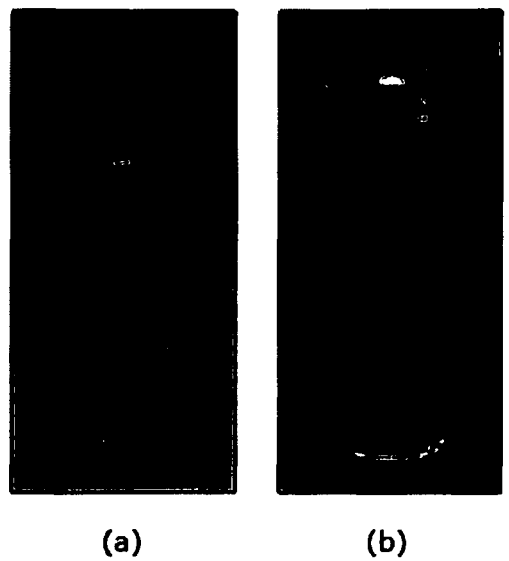

(a)   (b)

Figure 27

Signed and Sealed this
Eighth Day of February, 2011

David J. Kappos
*Director of the United States Patent and Trademark Office*